US010217284B2

(12) United States Patent
Das et al.

(10) Patent No.: US 10,217,284 B2
(45) Date of Patent: Feb. 26, 2019

(54) AUGMENTED VIRTUALITY

(71) Applicant: QUALCOMM Incorporated, San Diego, CA (US)

(72) Inventors: Saumitra Mohan Das, Santa Clara, CA (US); Rajarshi Gupta, Sunnyvale, CA (US); Sameera Poduri, Santa Clara, CA (US); Behrooz Khorashadi, Mountain View, CA (US)

( * ) Notice: Subject to any disclaimer, the term of this patent is extended or adjusted under 35 U.S.C. 154(b) by 248 days.

(21) Appl. No.: 14/042,213

(22) Filed: Sep. 30, 2013

(65) Prior Publication Data

US 2015/0091941 A1    Apr. 2, 2015

(51) Int. Cl.
*G06T 19/00* (2011.01)
*A63F 13/23* (2014.01)
(Continued)

(52) U.S. Cl.
CPC ............ *G06T 19/006* (2013.01); *A63F 13/20* (2014.09); *A63F 13/23* (2014.09); *A63F 13/40* (2014.09);
(Continued)

(58) Field of Classification Search
None
See application file for complete search history.

(56) References Cited

U.S. PATENT DOCUMENTS 6,522,312 B2 * 2/2003 Ohshima ................. A63F 13/00 273/309
7,646,394 B1    1/2010 Neely, III
(Continued)

FOREIGN PATENT DOCUMENTS

CN  102142055 A  8/2011
CN  102377873 A  3/2012
(Continued)

OTHER PUBLICATIONS

Cruz-Neira, Carolina, Jason Leigh, Michael Papka, Craig Barnes, Steven M. Cohen, Sumit Das, Roger Engelmann et al. "Scientists in wonderland: A report on visualization applications in the CAVE virtual reality environment." In Virtual Reality, 1993. Proceedings., IEEE 1993 Symposium on Research Frontiers in, pp. 59-66. IEEE, 1993.*

(Continued)

*Primary Examiner* — Xiao M Wu
*Assistant Examiner* — Steven Z Elbinger
(74) *Attorney, Agent, or Firm* — Thien T. Nguyen

(57) ABSTRACT

Techniques for providing a user with an augmented virtuality (AV) experience are described herein. An example of a method of providing an AV experience includes determining a location of a mobile device, determining a context based on the location, obtaining AV object information, displaying the AV object information in relation to the context, detecting an interaction with the context, modifying the AV object information based on the interaction, and displaying the modified AV object information. The context may include weighting information. The weighting information may be based on Received Signal Strength Indication (RSSI) or Round-Trip Time (RTT) data. The weighting information may be associated with a composition of a physical object in the context. A user gesture may be received, and the AV object information may be modified based on the received gesture information.

9 Claims, 18 Drawing Sheets

(51) Int. Cl.
*A63F 13/88* (2014.01)
*G06F 3/01* (2006.01)
*A63F 13/20* (2014.01)
*A63F 13/40* (2014.01)
*A63F 13/45* (2014.01)
*A63F 13/216* (2014.01)
*A63F 13/217* (2014.01)
*A63F 13/332* (2014.01)

(52) U.S. Cl.
CPC .............. *A63F 13/45* (2014.09); *A63F 13/88* (2014.09); *G06F 3/011* (2013.01); *G06F 3/017* (2013.01); *A63F 13/216* (2014.09); *A63F 13/217* (2014.09); *A63F 13/332* (2014.09); *A63F 2300/8082* (2013.01)

(56) References Cited

U.S. PATENT DOCUMENTS

| | | | |
|---|---|---|---|
| 2008/0252640 A1* | 10/2008 | Williams | G06T 19/003 345/420 |
| 2009/0174703 A1* | 7/2009 | Hermanson | G06T 13/60 345/419 |
| 2010/0287485 A1* | 11/2010 | Bertolami | G06F 3/011 715/764 |
| 2011/0242134 A1 | 10/2011 | Miller et al. | |
| 2011/0306422 A1* | 12/2011 | Nishimoto | A63F 13/422 463/36 |
| 2012/0032877 A1* | 2/2012 | Watkins, Jr. | G06F 1/1624 345/156 |
| 2012/0069051 A1* | 3/2012 | Hagbi | G06T 19/006 345/633 |
| 2012/0155705 A1* | 6/2012 | Latta | G06F 3/017 382/103 |
| 2012/0176525 A1* | 7/2012 | Garin | G01C 21/20 348/333.02 |
| 2012/0195460 A1 | 8/2012 | Lawrence | |
| 2012/0195461 A1 | 8/2012 | Lawrence | |
| 2012/0306920 A1 | 12/2012 | Bathiche et al. | |
| 2012/0315992 A1* | 12/2012 | Gerson | A63F 13/12 463/42 |
| 2013/0002548 A1* | 1/2013 | Ueno | H04N 13/0497 345/158 |
| 2013/0083062 A1* | 4/2013 | Geisner | G02B 27/017 345/633 |
| 2013/0178257 A1* | 7/2013 | Langseth | G06T 17/05 463/4 |
| 2013/0215235 A1* | 8/2013 | Russell | H04N 13/0203 348/47 |
| 2014/0171119 A1* | 6/2014 | Fraccaroli | H04W 4/021 455/456.3 |
| 2014/0267282 A1* | 9/2014 | Ren | G06F 3/03 345/428 |
| 2014/0354532 A1* | 12/2014 | Mullins | G06F 3/015 345/156 |
| 2015/0009117 A1* | 1/2015 | Peters | G06F 3/013 345/156 |

FOREIGN PATENT DOCUMENTS

| | | |
|---|---|---|
| CN | 102523758 A | 6/2012 |
| CN | 103079661 A | 5/2013 |
| JP | 2012212225 A | 11/2012 |
| JP | 2013059573 A | 4/2013 |
| JP | 2013122708 A | 6/2013 |
| WO | 2011109167 A1 | 9/2011 |
| WO | 2013035758 A1 | 3/2013 |

OTHER PUBLICATIONS

International Search Report and Written Opinion—PCT/US2014/057095—ISA/EPO—dated Jan. 21, 2015, p. 12.
International Preliminary Report on Patentability—PCT/US2014/057095—European Patent Office—Munich, Germany—dated Apr. 14, 2016—9 pgs.
Freely Change the Size of Hydracle, Arad War Chronicle: Dungeon and Monster Guide + Items, Japan, SB Creative Corp., Jan. 25, 2010, First edition, pp. 114.

* cited by examiner

|               | Weighting Information ⌐182a |        |        |         |          |
|---------------|------|-------|--------|---------|----------|
| AV Object | Null | Brick | Glass  | Drywall | Concrete |
| Ball          | NC   | B(v,d)| Bk(v)  | B(v,d)  | B(v,d)   |
| Water         | NC   | P(t)  | Bk(t)  | H(d)    | B(v,d)   |
| Fire Ball     | R(x) | S(s,r)| Bk(s,r)| S2(s,r) | S(s,r)   |
| Robot         | NC   | H(d)  | V(d)   | H(d)    | H(d)     |

↖1320 ↖1322

AUGMENTED VIRTUALITY

BACKGROUND

Mobile computing devices (mobile devices) provide users with access to a variety of information via wireless communication systems. Some mobile computing devices may be used for augmented reality (AR) applications, in which a real world object is imaged and displayed on a screen along with computer generated information, such as an image or textual information. AR can be used to provide information, either graphical or textual, about a real world object, such as a building or product. Typically, the location or other surrounding objects are not considered when rendering an AR object.

SUMMARY

In addition for use in augmented reality applications, a mobile devices may also enable users to explore Augmented Virtuality (AV) where real world objects or events are merged into a virtual world. For example, a position determining module on mobile device may be used to present a user with a context (e.g., a map, location, images) of their surrounding environment (which comprises the virtual world) in conjunction with a graphical object which depicts the relative location of an augmented virtuality object. The mobile device can be configured to allow the user to interact with the augmented virtuality object based on the location of the mobile device, as well as on the features associated with object. An augmented virtuality object can be accessed via a network, or previously stored on a mobile device. An augmented virtuality object can be a virtual object with features (e.g., variables) such as size, shape, location, speed, and direction. The virtual object may be associated with a graphic image or other animation object based on a real world or fantastic objects (e.g., a ball, a flying coupon, a flood, a swarm of bugs, a monster, etc. . . . ). The virtual objects may be used in business application, such as marketing and advertising, as well as in educational and recreational applications, such as training aids and games. The behavior of the virtual object in the virtual world depicted on the mobile device may be based on an algorithm or based on inputs from events happening in the real world context of the user or some combination thereof.

An example of a method for providing augmented virtuality (AV) on a mobile device according to the disclosure includes determining a location of the mobile device, determining a context based on the location, obtaining AV object information, displaying the AV object information in relation to the context, detecting an interaction with the context, modifying the AV object information based on the interaction, and displaying the modified AV object information.

Implementations of the method may include one or more of the following features. The context may include weighting information. The weighting information may be based on Received Signal Strength Indication (RSSI) or Round-Trip Time (RTT) data. The weighting information may be associated with a composition of a physical object in the context. A user gesture may be received, and the AV object information may be modified based on the received gesture information. An alert may be provided to the user, and AV object information may be modified based on a reaction time, such that the reaction time is a difference between a time the alert signal is provided and a time the gesture is received. AV object information may be received from an augmented virtuality (AV) server, the modified AV object information may be provided to the AV server.

An example of a method for providing augmented virtuality (AV) on a mobile device according to the disclosure includes determining a context based on a location of the mobile device, generating a state for an AV object, determining a context interaction result, modifying the state of the AV object based on the context interaction result, determining a mobile device interaction result, modifying the state of the AV object based on the mobile device interaction result, and displaying the AV object.

Implementations of the method may include one or more of the following features. The state of the AV object may include a direction variable. The state of the AV object may be modified based on the context interaction result including modifying the direction variable. Modifying the state of the AV object based on the mobile device interaction result may include modifying the direction variable. The state of the AV object may include a size variable. Modifying the state of the AV object based on the context interaction result may include modifying the size variable. The mobile device interaction result may be determined by receiving a gesture from a user. A state of the mobile device may be modified based on the mobile device interaction result.

An example of a method of using virtual tools in Augmented Virtuality (AV) applications according to the disclosure includes determining a context based on a location of a mobile device, generating a state for a virtual threat, generating a state for a virtual tool, determining a context interaction result, determining a tool interaction result, modifying the state of the virtual threat based on the context interaction result and the tool interaction result, and displaying the virtual threat and the virtual tool.

Implementations of the method may include one or more of the following features. The state of the virtual tool may include a location variable. The state of the virtual tool may be modified based a state of the mobile device. The tool interaction result may be determined based on the modified state of the virtual tool. The tool interaction result may constrain the state of the virtual threat.

An example of a method of determining interaction variables in an Augmented Virtuality (AV) application according to the disclosure includes obtaining a context, determining location data corresponding to one or more areas within the context, determining weighting information for each of the one or more areas, determining interaction variables based on the weighting information, and storing the interaction variables.

Implementations of the method may include one or more of the following features. The weighting information may be based on RSSI information. The weighting information may be based on RTT information.

An example of a method for providing augmented virtuality (AV) on a mobile device according to the disclosure includes determining a context based on a location of the mobile device, establishing a control area within the context, generating a state for a roving threat, wherein the state of the roving threat is constrained by the context, determining an engagement zone for the roving threat, wherein the engagement zone is constrained by the context, determining a state of the mobile device, wherein the state includes a current location, and initiating a first mini-game based on the state of the mobile device.

Implementations of the method may include one or more of the following features. The first mini-game may be initiated when the location of the mobile device is within the control area. A second mini-game may be initiated when the location of the mobile device is within the engagement zone. The engagement zone may be a line of sight variable. The line of sight variable may be constrained by the context.

An example of a method for providing Augmented Virtuality (AV) object information to one or more mobile devices according to the disclosure includes registering a mobile device with an AV server, receiving AV object information and a peer position update from the AV server, and providing a position update to the AV server. In an implementation of the method, a gesture update can be provided to the AV server.

An example of a method for providing Augmented Virtuality (AV) object information to one or more of mobile devices according to the disclosure includes registering a mobile device with an AV server, receiving an AV object physics engine module, and providing AV object state variable updates to the AV server.

An example of an apparatus for providing augmented virtuality (AV) on a mobile device according to the disclosure includes a memory module, a processor coupled to the memory module and configured to determine a location of a mobile device, determine a context based on the location, obtain an AV object information, display the AV object information in relation to the context, detect an interaction with the context, modify the AV object information based on the interaction, and display the modified AV object information.

An example of an apparatus for providing augmented virtuality (AV) on a mobile device according to the disclosure includes a memory module, a processor coupled to the memory module and configured to determine a context based on a location of the mobile device, generate a state for an AV object, determine a context interaction result, modify the state of the AV object based on the context interaction result, determine a mobile device interaction result, modify the state of the AV object based on the mobile device interaction result, and display the AV object.

An example of an apparatus for providing augmented virtuality (AV) on a mobile device according to the disclosure includes a memory module, a processor coupled to the memory module and configured to determine a context based on a location of the mobile device, generate a state for an AV object, determine a context interaction result, modify the state of the AV object based on the context interaction result, determine a mobile device interaction result, modify the state of the AV object based on the mobile device interaction result, and display the AV object.

An example of an apparatus for using virtual tools in Augmented Virtuality (AV) applications according to the disclosure includes a memory module, a processor coupled to the memory module and configured to determine a context based on a location of a mobile device, generate a state for a virtual threat, generate a state for a virtual tool, determine a context interaction result, determine a tool interaction result, modify the state of the virtual threat based on the context interaction result and the tool interaction result, and display the virtual threat and the virtual tool.

An example of an apparatus for determining interaction variables in an Augmented Virtuality (AV) application according to the disclosure includes a memory module, a processor coupled to the memory module and configured to obtain a context, determine location data corresponding to one or more areas within the context, determine weighting information for each of the areas, determine interaction variables based on the weighting information, and store the interaction variables.

An example of an apparatus for providing a user with an Augmented Virtuality (AV) experience according to the disclosure includes a memory module, a processor coupled to the memory module and configured to determine a context based on a location of a mobile device, establish a control area within the context, generate a state for a roving threat, wherein the state of the roving threat is constrained by the context, determine an engagement zone for the roving threat, wherein the engagement zone is constrained by the context, determine a state of the mobile device, wherein the state includes a current location, and initiate a first mini-game based on the state of the mobile device.

An example of a computer program product residing on a processor-executable storage medium according to the disclosure includes processor-executable instructions configured to cause a processor to determine a location of a mobile device, determine a context based on the location, obtain an AV object information, display the AV object information in relation to the context, detect an interaction with the context, modify the AV object information based on the interaction, and display the modified AV object information.

An example of a computer program product residing on a processor-executable storage medium according to the disclosure includes processor-executable instructions configured to cause a processor to determine a context based on a location of a mobile device, generate a state for an AV object, determine a context interaction result, modify the state of the AV object based on the context interaction result, determine a mobile device interaction result, modify the state of the AV object based on the mobile device interaction result, and display the AV object.

An example of a computer program product residing on a processor-executable storage medium according to the disclosure includes processor-executable instructions configured to cause a processor to determine a context based on a location of a mobile device, generate a state for a virtual threat, generate a state for a virtual tool, determine a context interaction result, determine a tool interaction result, modify the state of the virtual threat based on the context interaction result and the tool interaction result, and display the virtual threat and the virtual tool.

An example of a computer program product residing on a processor-executable storage medium according to the disclosure includes processor-executable instructions configured to cause a processor to obtain a context, determine location data corresponding to one or more areas within the context, determine weighting information for each of the areas, determine interaction variables based on the weighting information, and store the interaction variables.

An example of a computer program product residing on a processor-executable storage medium according to the disclosure includes processor-executable instructions configured to cause a processor to determine a context based on a location of a mobile device, establish a control area within the context, generate a state for a roving threat, wherein the state of the roving threat is constrained by the context, determine an engagement zone for the roving threat, wherein the engagement zone is constrained by the context, determine a state of the mobile device, wherein the state includes a current location, and initiate a first mini-game based on the state of the mobile device.

Items and/or techniques described herein may provide one or more of the following capabilities, as well as other capabilities not mentioned. A context can be associated with a location of a mobile device. Weighting functions for the context can be determined. Augmented Virtuality (AV) objects are virtual objects which can be presented on one or more mobile devices. AV objects can model real world objects (e.g., a ball, flowing water, wild animals, bubbles, expanding gas, etc. . . . ), as well as imaginary objects (e.g., a magic fire ball, an alien robot, angry giants, flying coupons). AV objects can include state variables to model virtual and physical attributes. Users can interact with AV objects via sensors in a mobile device. The state variables of one or more AV objects can be modified or constrained based on the context. An AV server can host and operate AV applications. Designers can register AV applications on an AV server. AV applications, and associated AV objects, can be provided to mobile devices. AV applications can be executed in local and client configurations. Mobile devices can be configured to provide location and AV object state information to an AV server. An AV server can be configured to propagate AV object state information to one or more mobile devices. An AV object can represent a virtual tool (i.e., another AV object) and a user can interact with a virtual tool via sensors in a mobile device. Virtual tools can include state variables, which can be modified or constrained based on the context. Virtual tools can be used to interact with AV objects. A context can include one or more control areas. A mobile device can be configured to execute one or more mini-games based on its proximity to a control area. Other capabilities may be provided and not every implementation according to the disclosure must provide any, let alone all, of the capabilities discussed. The results of the interaction between an AV object and a context can be utilized in a wide range of business, education and entertainment applications. Further, it may be possible for an effect noted above to be achieved by means other than that noted, and a noted item/technique may not necessarily yield the noted effect.

DETAILED DESCRIPTION

Techniques are discussed herein for providing Augmented Virtuality (AV) objects to a user based on the location of the user and the context associated with the location. For example, a map of a real location is obtained from a positioning engine or server and provided to a mobile device. The map can include additional context information such as a heatmap, which represents weighting functions associated with various objects and structural features in the location. The weighting functions can be based on RSSI (Received Signal Strength Indicator) and RTT (Round Trip Time) data obtained from access points. For example, the weighting functions can be used to determine the locations of walls and other obstacles or the way in which AV objects will move or be mutated within that context. The context may include information about structural elements such as, for example, the locations of rooms, walls, doors, corridors, and other architectural features. The state variables (i.e., the state) of an AV object can be modified based on interaction with the context and the user. For example, a physics engine executing on an AV server or a mobile device may be used to calculate the results of the interactions between the AV object and the context, and/or the interactions between the AV object and user. The state of an AV object is propagated or otherwise accessible to other mobile devices within a location. For example, the interactions between one or more AV objects with the context can be used in various business, educational and entertainment applications. These examples, however, are not exhaustive.

Figure 1:
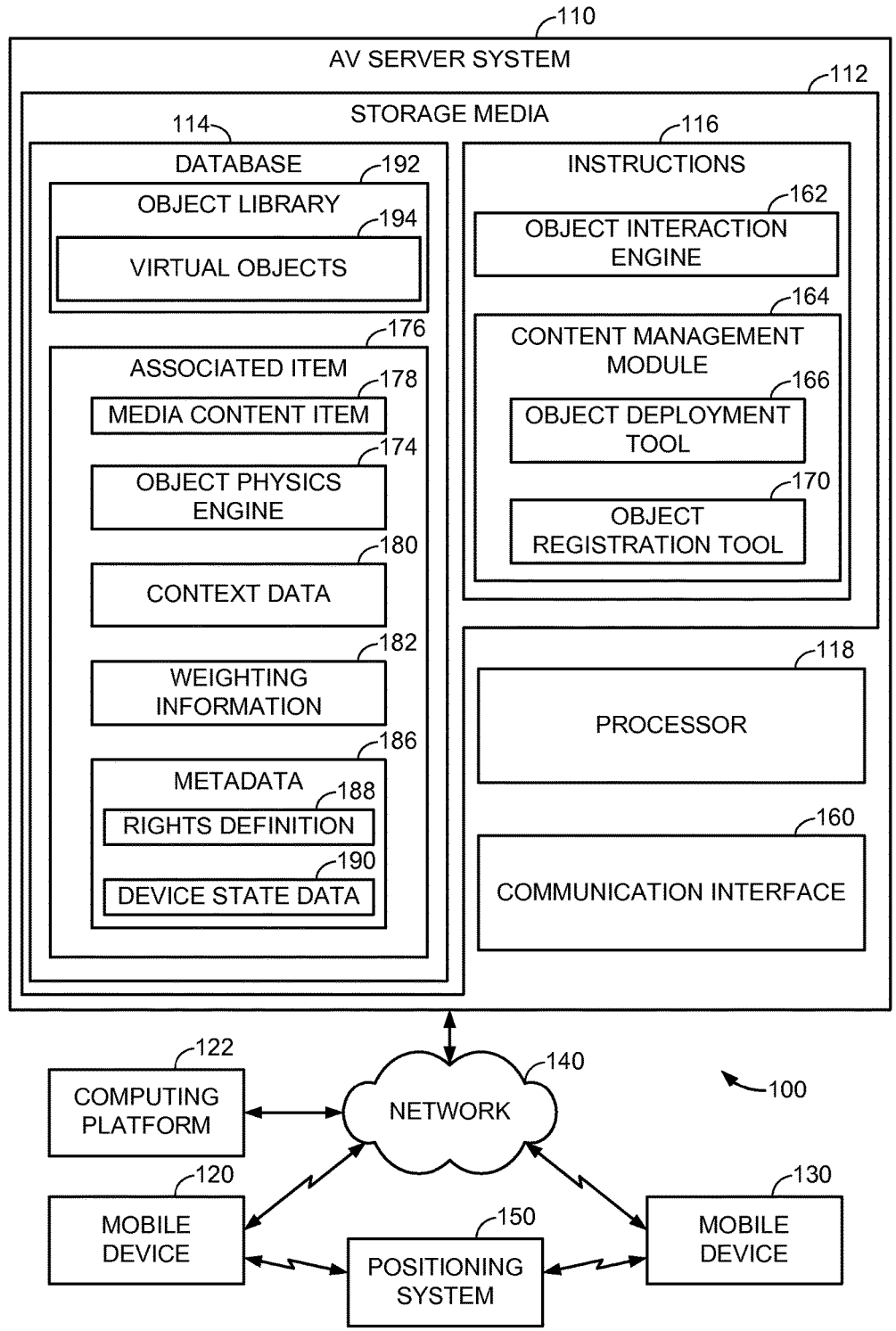
FIG. 1 is an exemplary network environment for an Augmented Virtuality (AV) system.

Referring to FIG. 1, an exemplary network environment 100 for an Augmented Virtuality (AV) system is shown. Network environment 100 may include any number of mobile devices such as, for example, mobile devices 120 and 130. Mobile devices 120 and 130 may communicate wirelessly with an AV server 110 via network 140. Mobile devices 120 and 130 may comprise any suitable mobile computing platform, including a cellular phone, a smart phone, a personal digital assistant, a low duty cycle communication device, a laptop computer, a portable media player device, a personal navigation device, and a portable electronic device comprising a digital camera, to name a few examples. Network environment 100 may further include non-mobile computing platforms such as computing platform 122 that may also communicate with the AV server 110 via network 140. In at least some implementations, a mobile device may be adapted to communicate by docking with computing platform 122 by wired or wireless communication, for example, without utilizing network 140.

Network 140 may comprise one or more of a wide area network (e.g., the Internet), a local area network (e.g., an intranet), and/or a personal area network. For example, mobile devices 120 and 130 may communicate wirelessly with the AV server 110 via any suitable communication protocol, including cellular communication protocols such as CDMA, GSM, or WCDMA and/or wireless local area network (WLAN) protocols such as Wifi or WiMAX.

Accordingly, network 140 may include one or more wireless transceivers in such implementations. Wireless transceivers of network 140 may also be utilized by mobile devices 120 and 130 to obtain positioning information for estimating mobile device position.

In some implementations, a trilateration based approach may be utilized by a mobile device to estimate geographic position. For example, techniques including Advanced Forward Link Trilateration (AFLT) in CDMA or Enhanced Observed Time Difference (EOTD) in GSM or Observed Time Difference of Arrival (OTDOA) in WCDMA may be used, which measures at a mobile device the relative times of arrival of wireless signals transmitted from each of several transmitter equipped base stations. As another example, a mobile device may estimate its position by obtaining a Media Access Control (MAC) address or other suitable identifier associated with a wireless transceiver and correlating the MAC address or identifier with a known geographic location of that wireless transceiver.

Mobile devices 120 and 130 may further obtain wireless positioning signals from a positioning system 150 to estimate mobile device position. For example, positioning system 150 may comprise a Satellite Positioning System (SPS) and/or a terrestrial based positioning system. Satellite positioning systems may include, for example, the Global Positioning System (GPS), Galileo, GLONASS, NAVSTAR, GNSS, a system that uses satellites from a combination of these systems, or any SPS developed in the future. As used herein, an SPS will also be understood to include pseudolite systems. Terrestrial positioning techniques may also be used, such as WiFi/WLAN methods including using RSSI and/or RTT of WiFi and WLAN signals. The positioning system 150 may be a positioning server and the functionality of the positioning system 150 may be included in the AV server 110. It should be understood, however, that particular positioning techniques provided here are merely example positioning techniques, and that claimed subject matter is not limited in this respect.

The AV server 110 may comprise one or more servers and/or other suitable computing platforms. Accordingly, the AV server 110 may include storage media 112 having database 114 and instructions 116 stored thereon. The storage media 112 may be considered a memory module. The AV server 110 may include one or more processors such as example processor 118 for executing instructions 116 and/or for facilitating storage and retrieval of data at database 114. The processor 118 is preferably an intelligent device, e.g., a personal computer central processing unit (CPU) such as those made by Intel® Corporation or AMD®, a microcontroller, an application specific integrated circuit (ASIC), etc. The AV server 110 may further include a communication interface 160 for facilitating communication with clients of network 140, including mobile devices 120 and 130, and computing platform 122.

To facilitate understanding of the disclosed implementations, instructions 116 may be at times described in terms of one or more modules for performing particular operations. As one example, instructions 116 may include an object interaction engine module 162 to determine the results of an interaction between an AV object and the context and/or a user. As another example, instructions 116 may include a content management module 164 to manage the deployment of AV object information within a network. Content management module 164 may include a number of tools to enable a user (e.g., a human user) to interact with the content management module, for example, via a mobile device (e.g., mobile device 120) or other suitable computing platform (e.g., computing platform 122). In at least some implementations, content management module 164 may include an object deployment tool 166 to enable a developer (i.e., user) to deploy AV objects within a network system, and an object registration tool 170 to enable a developer to register AV objects and manage access rights of other users to AV object content that has been deployed by that developer. Such tools may be accessible to a developer via input or output devices of a mobile device or other suitable computing platform. For example, a graphical user interface (GUI) presented at a graphical display of a mobile device may enable a developer to define an AV object comprising one or more attribute files and other media content items by using one or more of tools 166, and 170.

Database 114 may include a variety of data, including one or more associated items. Associated item 176 may include, for example, at least one media content item 178 and other associated data elements, including for example: a context data 180, weighting information 182, metadata 186, and an object physics engine module 174. Database 114 may further include an object library 192 having one or more pre-existing virtual objects 194.

The context data 180 may define a location relative to the location of a user, where media content such as a floor plan (e.g., media content item 178) may be presented. Context data 180 may be defined by a user via object deployment tool 166. For example, the context data 180 may be an electronic medium such as a digital floor plan (e.g., AutoCAD .dwg file, a Building Information Model (BIM), Sketch-Up files).

Weighting information 182 may define the structural aspects of physical objects within a context. For example, map processing techniques can be used to process a building layout and assign properties and/or attributes to the building features. In an embodiment, RSSI and/or RTT models can be used to estimate the properties and/or attributes of the building features. The weighting information may be used to model other physical objects such as obstructions and/or other environmental conditions within a context. Weighting information 182 may be defined by a user via object deployment tool 166. For example, a user may utilize object deployment tool 166 to enter context related input for the object interaction engine module 162.

Metadata 186 may include a rights definition 188 defining rights of users to access deployed media content items such as associated media content item 178. As a non-limiting example, a user may exclude select users from accessing a particular media content item (e.g., an AV object and associated files), or a user may grant select users the right to access a particular media content item within a context.

Metadata 186 may further include device state data 190 that is associated with media content item 178. Device state data 190 may indicate a position and/or orientation of a mobile device, for example, while the mobile device is interacting with an AV object. In some implementations, a position of a mobile device may be represented as one or more latitude, longitude, and/or altitude values measured relative to a reference datum. Similarly, orientation of a mobile device may be represented by one or more roll, pitch, and/or yaw values measured relative to a reference datum. The state of a mobile device may include received gesture updates such as taps, swipes, and shakes. Such device state data may be based upon one or more positioning signals and/or inertial sensor measurements that are obtained at the mobile device as will be described in greater detail with reference to FIG. 2.

Figure 2:
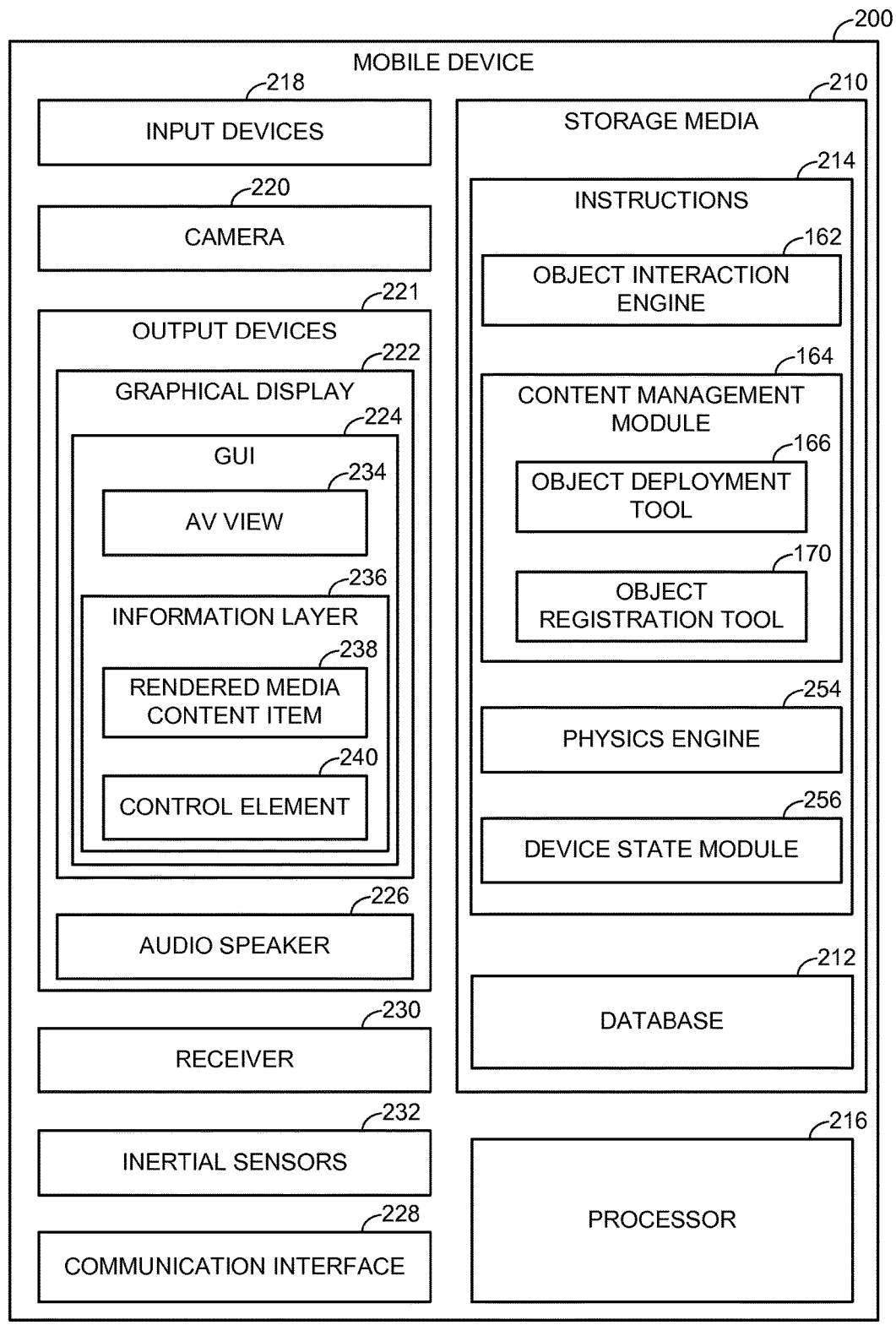
FIG. 2 is schematic block diagram of an exemplary mobile device.

Referring to FIG. 2, a schematic block diagram of an example mobile device 200 is shown. Mobile device 200 may serve as a non-limiting example of mobile devices 120 and 130 of FIG. 1 for at least some implementations. Accordingly, mobile device 200 may include a communication interface 228 to facilitate communication with other computing platforms, such as an AV server 110, mobile devices 120, 130 and/or computing platform 122 of FIG. 1, for example. In an embodiment, the communication interface 228 may be configured to communicate with other networks (e.g., WAN, WLAN), and may be configured to be used in location determination (e.g., SPS signals). The communication interface 228 may enable wireless communication with communication networks including example network 140. Mobile device 200 may further include a receiver 230 to receive positioning signals from a positioning system such as positioning system 150, for example.

Mobile device 200 may include input devices 218 to receive user inputs. Input devices 218 may include, for example, one or more physical buttons, keyboards, controllers, microphones, pointing devices, and/or touch-sensitive surfaces. Mobile device 200 may include output devices 221 to present information to a user. As one example, output devices 221 may include a graphical display 222 to present a graphical user interface 224. In general, the graphical display 222 may comprise a touch-sensitive graphical display (e.g., a touch screen) capable of receiving user input. A touch-sensitive graphical display may utilize any suitable sensing technique for detecting user input at or near a display surface, including capacitive sensing, resistive sensing, and/or optical sensing techniques, for example. In such touch-sensitive implementations, graphical display 222 may serve as both an input device for receiving user input and an output device for presenting graphical content. Output devices 221 may further include an audio speaker 226 for presenting audio content in some implementations.

In at least some implementations, a graphical user interface (GUI) 224 may be presented at graphical display 222. A GUI 224 may include an AV view 234 to present AV objects with context information. Information layer 236 may comprise one or more rendered media content items such as rendered media content item 238 and one or more graphical control elements such as graphical control element 240. As a non-limiting example, rendered media content item 238 may correspond to a rendered state of media content item 178 such as an image, a video, an animation, among other suitable graphical content or a portion thereof. Graphical control element 240 may include one or more graphical elements for enabling a user to provide user input for controlling functionality of the mobile device.

Mobile device 200 may include one or more inertial sensors 232 to obtain inertial sensor measurements on-board the mobile device. In at least some implementations, inertial sensors 232 may comprise one or more accelerometers, gyroscopes, or other suitable devices for measuring an inertial state of a mobile device. In some implementations, an inertial state of a mobile device may be measured by inertial sensors 232 along multiple axes in Cartesian and/or polar coordinate systems to provide an indication of position and/or orientation of the mobile device.

It will be appreciated that inertial sensor measurements obtained from inertial sensors 232 may be processed (e.g., integrated over time) to obtain such estimates of mobile device position and/or orientation. As previously described, a position of a mobile device may be represented as one or more latitude, longitude, and/or altitude values and an orientation of a mobile device may be represented by one or more roll, pitch, and/or yaw values measured relative to a reference datum. Mobile device 200 may include a camera 220 to obtain a camera view which may be presented at graphical display 222. Camera 220 may comprise a digital camera in some implementations having a number of optical elements including one or more lenses for focusing light and/or one or more light sensing elements for converting light into digital signals representative of image and/or video data. As a non-limiting example, a light sensing element may comprise an optical pickup, charge-coupled device and/or photoelectric device for converting light into digital signals. Digital signals obtained from one or more light sensing elements of the camera may be processed and/or rendered at graphical display 222 as camera view. Furthermore, in some implementations, a camera view obtained via camera 220 may be stored at storage media as image and/or video content. For example, digital signals obtained from camera 220 may be encoded and stored at storage media 210 as .jpeg, .mpeg, or other suitable format. Such digital signals representative of a camera view may be transmitted to other computing platforms for storage and/or processing. For example, a camera view obtained at a mobile device may be transmitted to a server system or other suitable computing platform via a communication network or by docking with another computing platform.

Mobile device 200 may further include storage media 210 having a database 212 and instructions 214 stored thereon. The storage media 210 can be a memory module. Mobile device 200 may include one or more processors such as example processor 216 for executing instructions 214 and/or facilitating storage and retrieval of data at database 212. Database 212 may include a variety of data, including some or all of the data elements previously described with reference to database 114 of FIG. 1. For example, database 212 may retain locally at mobile device 200, one or more of associated content item 176 and object library 192, among other data. It will be appreciated that such data may also be retained remotely, for example, at a server system such as the AV server 110 of FIG. 1 where it may be accessed by the mobile device via a wireless network.

Instructions 214 may similarly include one or more of the previously described modules and/or tools of instructions 116 of FIG. 1. For example, instructions 214 may include previously described object interaction engine module 162 and content management module 164 retained locally at mobile device 200. Instructions 214 may further include physics engine module 254 to model the motion and reaction of AV objects within a context. Instructions may further include a device state module 256 for processing positioning signals obtained via receiver 230 and/or inertial sensor measurements obtained via inertial sensors 232, as well as store state variables associated with an AV object. For example, device state module 256 may be adapted to estimate a position and/or orientation of mobile device 200 based, at least in part, on such positioning signals and/or inertial sensor measurements. An estimated position and/or orientation of mobile device 200 may be stored at database 212, for example, as previously described with reference to device state data 190. In at least some implementations, device state module 256 may be adapted to obtain device state data for a mobile device responsive to the interactions with an AV object. For example, an AV object can be a virtual dodge ball that can virtually hit the mobile device (e.g., based on the actual location of the mobile device), the device state module 256 can indicate that the mobile device has been hit, or is still free. Device state module 256 may be further adapted to associate the device state data with state specific media content items (e.g., as metadata), for example, at database 212 or database 114.

It will be appreciated that at least some elements of the example mobile device 200 of FIG. 2 may be present in other mobile or non-mobile computing platforms such as computing platform 122 of FIG. 1 to enable such computing platforms to perform one or more of the operations, processes, and methods described herein. For example, computing platform 122 of FIG. 1 may comprise storage media such as storage media 210 including instructions 214 and/or database 212, one or more processors such as processor 216, one or more input and output devices, and a communication interface such as communication interface 228.

Figure 3:
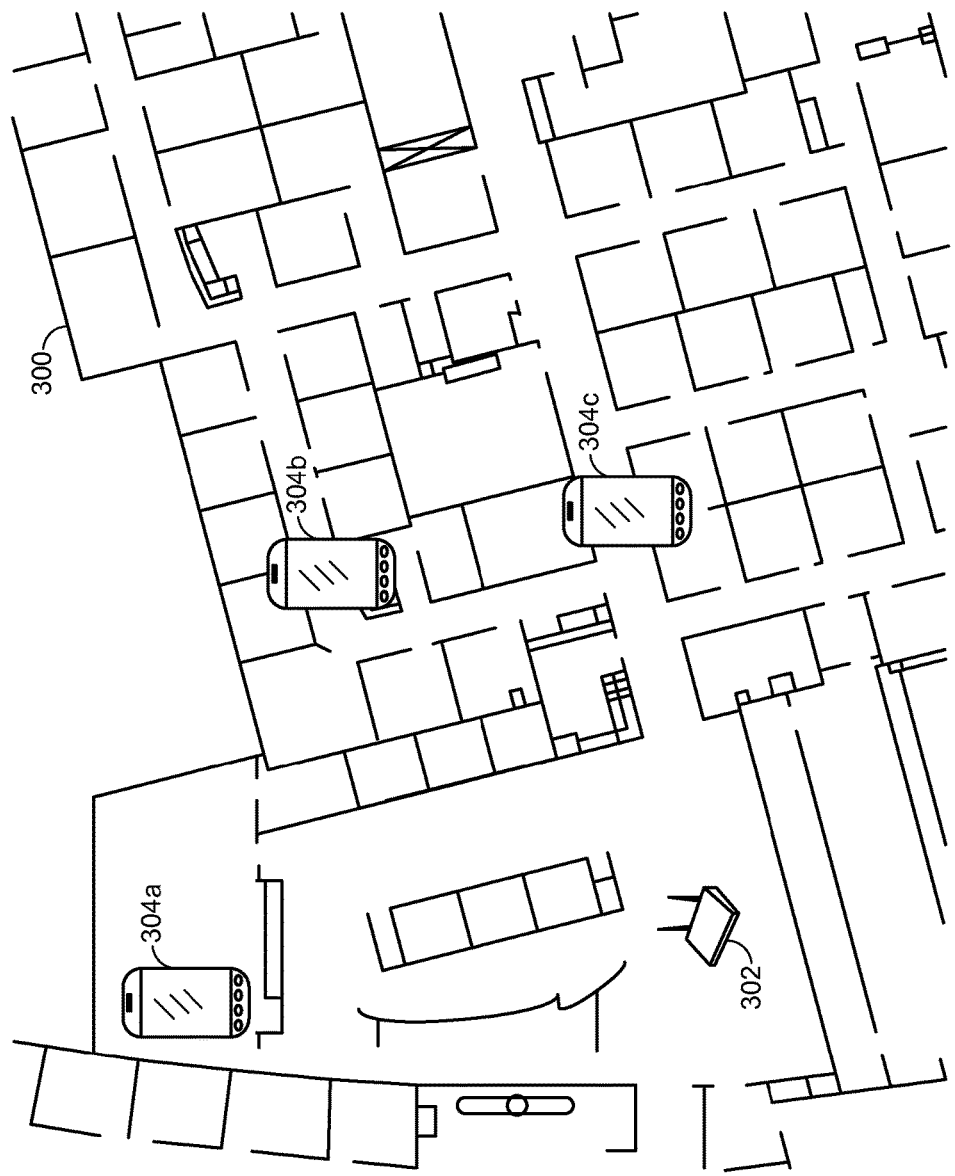
FIG. 3 is a top view of an exemplary configuration for determining weighting functions within a context.

Referring to FIG. 3, a top view of an exemplary configuration for determining weighting functions within a context is shown. The configuration includes a context 300, an access point 302, and three exemplary locations of one or more mobile devices 304a, 304b, 304c. The context 300 can represent a location including wall, corridors, and other obstacles. The term access point as used herein includes different variations of terrestrial transceivers (e.g., base stations, WiFi access points, femtocells). The access point 302 may allow the mobile devices 304a, 304b, 304c to connect to a wireless network using Wi-Fi, Bluetooth, a cellular communication technology such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), or any other suitable wireless technology and/or standard. In an embodiment, the access point 302 connected to the AV server 110 can communicate with one or more of the mobile devices 304a, 304b, 304c to determine or update weighting information. The AV server 110, or another positioning server may include the algorithms used to calculate weighting information. This information can come from current and/or historical data from one device or multiple devices (i.e., crowdsourcing), and may be kept on a central location (e.g., network element) and/or shared between mobile devices. In an example, a map server (or other network device) can maintain and update a context with corresponding weighting information (e.g., a heatmap) based on input from one or more mobile devices. Additionally or alternatively, each mobile device can maintain and update weighting information and/or share the updated weighting information with a server and/or other mobile device(s). Where a set of location data is associated with a particular context (e.g., building), a mobile device can store and maintain multiple sets of location data (e.g., maps) for multiple contexts. The location data and/or corresponding weighting information may also be time and/or date sensitive. For example, a heatmap in and/or around a crowded cafeteria during lunchtime on a weekday may be different than when it is virtually empty at midnight on a weekend.

In an embodiment, the AV server 110 can determine a context (e.g. an area) in which a mobile device is located. This initial determination can be based on any of a variety of data, such as previous known location, dead reckoning data, sensor data, GNSS and other signal sources, and the like. Some embodiments may provide for determining a rough location via a location tied to a particular MAC ID which is then used to determine a more accurate location. The context in which the mobile device is determined to be located can impact the of RSST and RTT measurements. The context can include information indicative of environmental conditions of one or more areas. The context can, for example, include a map, such as a layout of a building, which can indicate the location of physical objects such as walls, windows, doors, and/or other structures that could impact the condition of the area's environment. The location data can further include weighting information, which can be generated by using map processing algorithms and may also be indicative of a condition of the area's environment (e.g., number of walls between the area and an access point, wall composition type, a distance, hardware information of an access point, and/or a confidence level for RSSI and/or RTT data (e.g., distance measurements between the mobile device and an access point), etc.). The weighting information may pertain to a single access point, or more than one access points, with which RSSI and/or RTT data can be obtained.

RSSI and RTT data can weighted based on the condition of the environment. For example, the weighting, which can include weights for both RSSI and RTT data, can be calculated using one or more confidence metrics provided in the weighting information of the location data. It may also take into account specific information that may not be included in the weighting information, such as device-specific information for a given mobile device and/or access point. For example, a mobile device may have an antenna and/or other signal-reception hardware that would cause RSSI data to be more accurate than other mobile devices, in which case more weight can be given to the RSSI data. A mobile device may be configured to measure the RSSI and RTT information and provide the measurement data to a position server, or the AV server 110. In another example, an access point may have certain hardware that causes it to have a processing delay that is less consistent than many other access points, in which case less weight can be given to RTT data measured using that access point. When the location of the mobile is known, the weighting information can be used to model the environment (e.g., the physical objects). The object interaction engine module 162 can utilize the weighting information to model a wall which an AV object cannot pass, model deformation to an object depending on the number or characteristics of walls passed, or model a corridor which will not interact with an AV object. The weighting information can be utilized, for example, to determine the density of the walls between the access point 302 and the mobile devices 304a, 304b, 304c which can further govern how virtual objects will traverse to those mobile devices. In an embodiment, the network device(s) can maintain a heatmap which can be used by the object interaction engine module 162.

Figure 4:
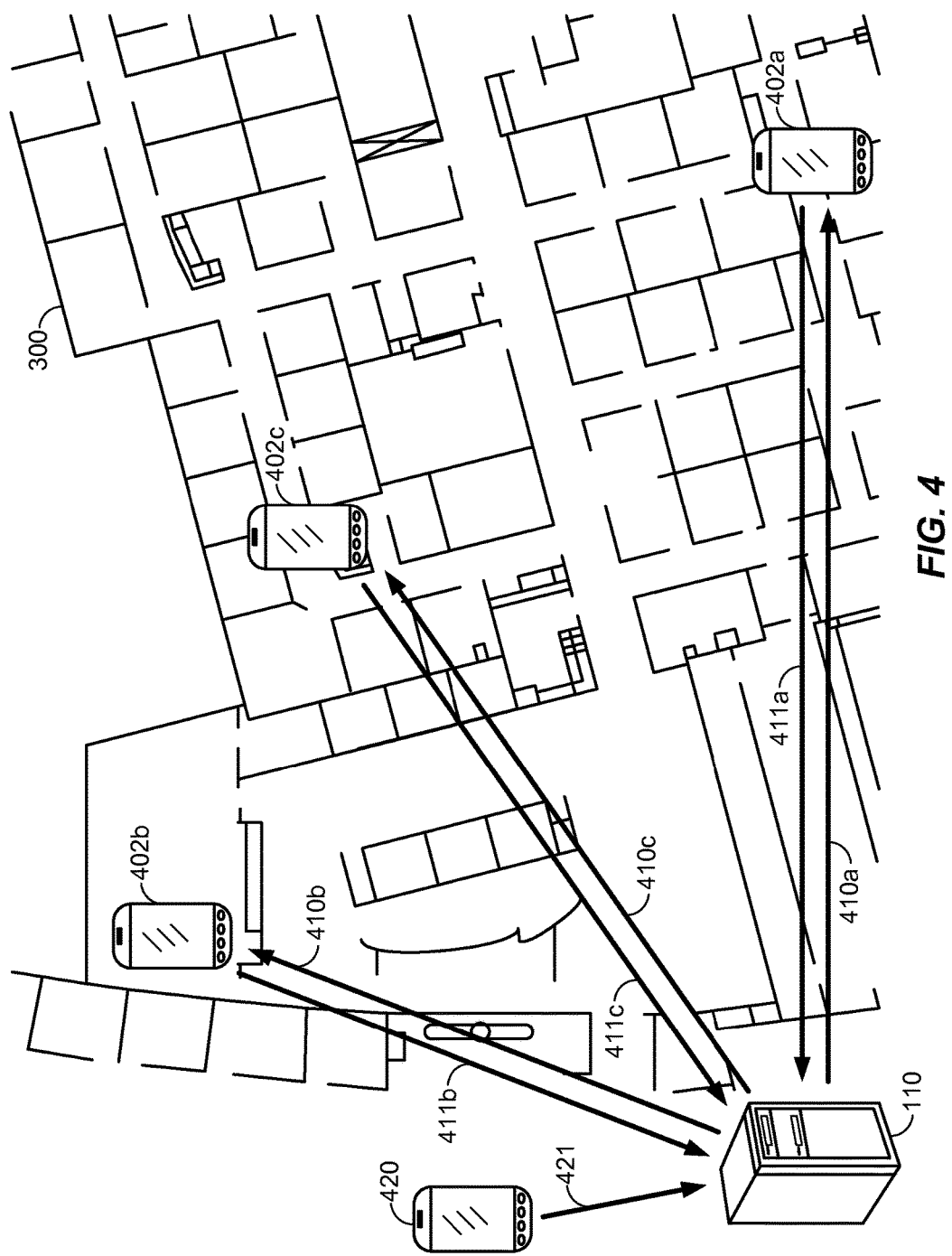
FIG. 4 is block flow diagram of an exemplary data transfer scheme between an AV server and one or more mobile devices.

Referring to FIG. 4, a block flow diagram of an exemplary data transfer scheme between an AV server and one or more mobile devices is shown. The transfer scheme includes an AV server 110, and user mobile devices 402a, 402b, 402c, (collectively 402) and a developer device 420. The mobile devices 402, 420 can be configured as previously discussed (e.g., mobile device 200). In an embodiment, mobile devices 402 and developer device 420 are configured to communicate with the AV server 110 through a network 140 and one or more access points (not shown). For purposes of explanation, the network 140 and access points are incorporated into a collection of inbound and outbound communication paths 410b-d, 411b-d, 420a. The outbound communication paths 410b-d (collectively 410) represent AV object information transmitted from the AV server 110 to the mobile devices, and the inbound communication paths 411b-d (collectively 411) represent AV object information transmitted from the mobile devices to the AV server 110. While shown as different communication paths, the inbound and outbound communication paths can be a single path. The developer device 420 communicates with the AV server 110 over the communication path 421.

In operation, a developer can create a virtual object and utilize the developer device 420 (or other computing platform 122) to register an AV object into the database 114. For example, the developer device 420 can access the content management module 164 to create, or upload, AV objects and the associated items 176. The architecture of the data transfer scheme between the AV server 110 and the mobile devices 402 based on the AV object and the capabilities of the mobile devices 402. In an example, the AV server 110 can provide initial AV object information including the associated items 176 to the mobile device over communication path 410. The object interaction engine module 162 can utilize the AV object information to enable user interaction with an AV object. The physics engine module 254 executing locally on the mobile device can simulate the motion of the AV object and the state variables describing the AV object, and the mobile device can be updated. The state updates can be sent to the AV server over the inbound communication path 411 and then broadcast to the other mobile devices over outbound communication path 410. In an embodiment, the mobile devices 402 can send device state information to the AV server 110 via the inbound communication path 411, and the AV server 110 can execute an object interaction engine module 162 to determine the interactions and corresponding state of an AV object. The AV object state information can then be transmitted to the mobile devices 402 via the outbound communication path 410. In the case of a single player (e.g., only one mobile device 402a), the AV server can be used to initialize an application on a mobile device without the need for further communication between the mobile device and the AV server. Other data transfer schemes may be used transfer AV object and mobile device state information to and from the AV server 110 and the mobile devices 402.

Figure 5:
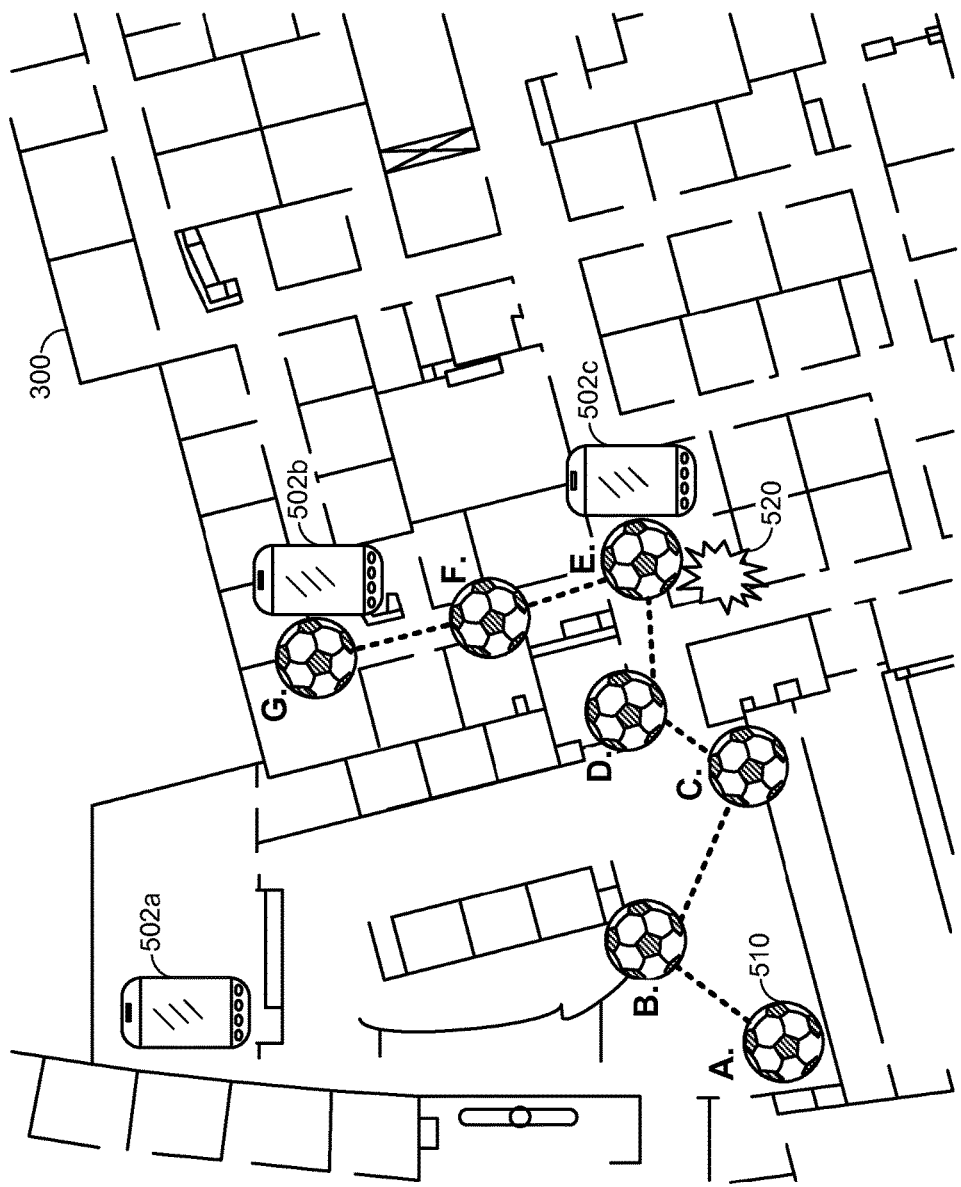
FIG. 5 is a top view of an exemplary AV object in multiple states.

Referring to FIG. 5, with further references to FIGS. 1 and 2, a top view of an exemplary AV object in multiple states is shown. The view includes a context 300, a one or more mobile devices 502a, 502b, 502c (collectively 502), a virtual ball 510 (i.e., an AV object), and an interaction event 520. The locations of the virtual ball 510 at various times are indicated with the letters A. through G. The AV server 110 can be configured to launch the virtual ball 510 at a random initial location variable, direction and velocity variables for the context 300. For example, the AV server 110 provides the initial state information for the virtual ball 510 to each of the mobile devices 502. The initial state information indicates that the virtual ball 510 begins at location 'A' and proceeds to location 'B' at an initial speed. The location and movement of the virtual ball 510 appears on the graphical display 222 of each of the mobile devices 502. In an embodiment, the AV server 110 utilizes the object interaction engine module 162 to update the state information on a periodic basis (e.g., 50 ms, 100 ms, 200 ms, 500 ms). For example, the object interaction engine module 162 processes a current state of the virtual ball 510 in view of the context data 180 and the weighting information 182 to produce a new state for the virtual ball 510. As a result, the weighting information 182 and/or context data 180 are used to create virtual boundaries that interact with the virtual ball 510. For example, referring to location 'B', the virtual ball 510 virtually bounces off a wall and proceeds to location 'C'. The results calculated by the object interaction engine module 162 can change state of the virtual ball 510. The state variables associated with position, speed, and direction of the virtual ball 510 can be changed and then provided to the mobile devices 502. State variables may also be updated on one or more mobile devices 502 and provided to an AV server for dissemination to other mobile devices participating in the application (if any). Other applications can have additional state variables. For example, virtual environmental aspects such as wind speed and direction may be used to alter the state of an AV object.

Continuing the example of the virtual ball 510, after the deflecting at locations 'C' and 'D', the virtual ball 510 continues down the corridor toward location 'E' and mobile device 502c. A user of the mobile device 502c can monitor the progress of the virtual ball 510 at it travels from position 'A' to position 'E'. As the virtual ball 510 approaches, the user can enter a gesture into the mobile device 502c to create the interaction event 520. The gesture can include a screen tap or swipe, a shake, or a swing motion. Other inputs to the mobile device 502c can be used as gestures to initiate the interaction event 520. The timing and the nature of the gesture can be captured by the device state module 256 and sent to the AV server 110 as an input to the object interaction engine module 162. For example, when the virtual ball 510 arrives at location 'E', the user of the mobile device 502c flicks the graphical display 222 to send the virtual ball 510 off toward location 'F'. The results of the interaction event can modify the state of the virtual ball 510. In general, modifying the state of an AV object means changing the values of state variables associated AV object attributes (e.g. direction and velocity). The virtual ball 510 can continue toward location 'G' and possible virtually collide with the mobile device 502b. In a gaming application, a user may gain points for virtually hitting another user with an AV object.

The virtual ball application of FIG. 5 is exemplary only, and not a limitation. Other applications can include objectives such as catching the AV object, or to find one or more AV objects (e.g., Easter egg hunt). In some gaming applications, the users can score points by using an AV object to hit other players (e.g., dodge ball) or by knocking the AV object (e.g., virtual ball) past a player (e.g., ping-pong). In an example, the user can be provided with an alert signal and must provide a gesture update to the mobile device within a certain timeframe (e.g., a reaction time) in order to successfully interact with the virtual object (e.g., hot potato). Other games based on position and context can be created. In an embodiment, an AV object can be presented on the graphical display 222 as an augmented reality object in the AV view 234. For example, a user may utilize the camera 220 to obtain a near real time view of objects in their surroundings (e.g., a hallway, a room), and an image of the virtual ball 510 travelling towards the user can be presented in relation to the objects in the camera view. The size of the AV object in the camera view can change based on the relative location of the AV object from the user (i.e., the virtual ball 510 can appear larger as it gets closer to the user).

Figure 6:
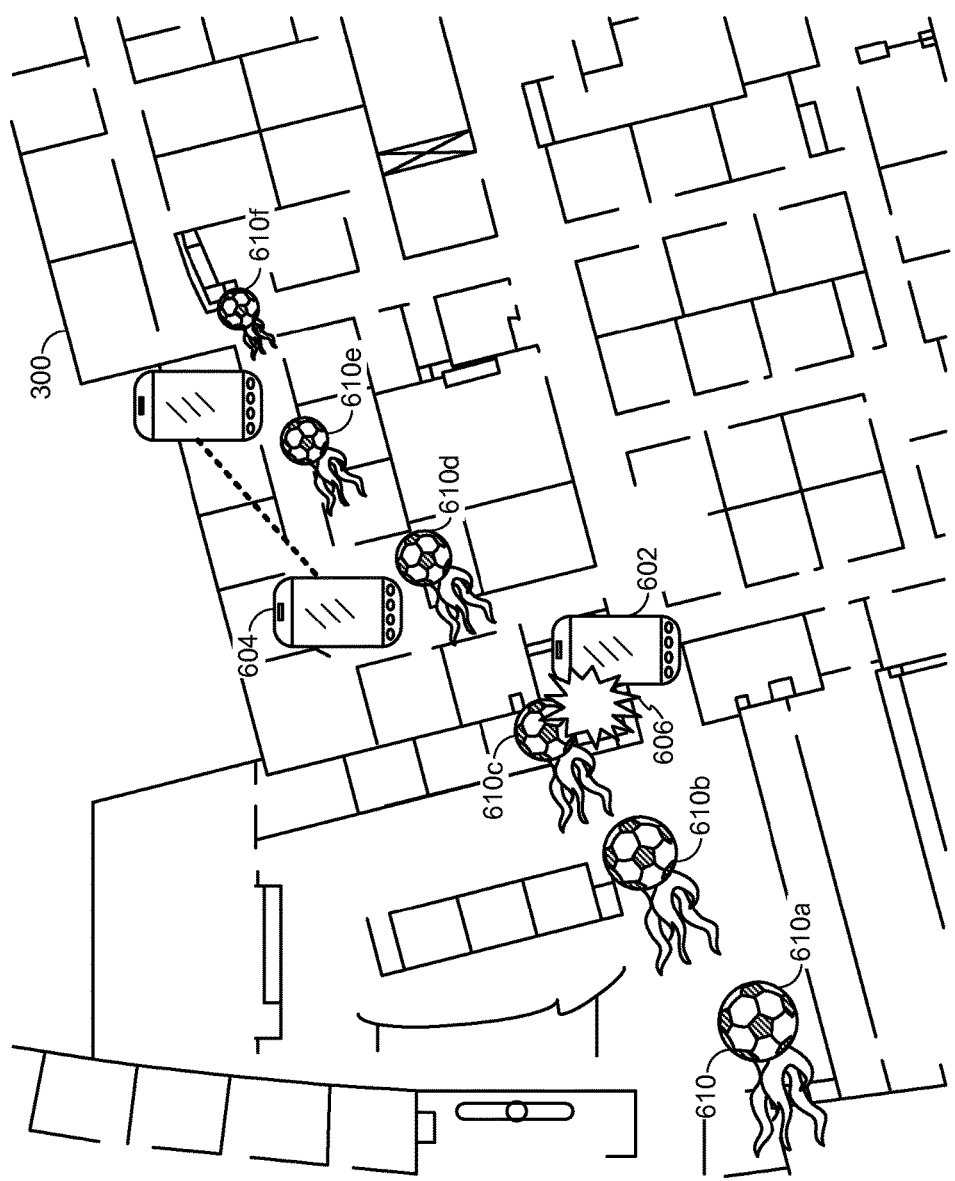
FIG. 6 is a top view of an exemplary AV object travelling through a context.

Referring to FIG. 6, a top view of an exemplary AV object travelling through a context 300 is shown. The view includes a context 300, a first mobile device 602, a second mobile device 604, an interaction area 606, and a fireball 610 (i.e., an AV object) represented in different states 610a-f. The fireball 610 is depicted as traveling through obstacles in the context 300. In an exemplary gaming application, the AV server 110 can produce a fantasy type virtual object such as a fireball 610. For example, the object library 192 and associated item 176 can include features associated with the attributes of the fireball 610, as well as other information such as a scoring mechanism. For example, object library 192 can include:

Fireball object=fireball.gif, physics=propagate through max 5 walls, radius reduces 20% with every wall pass.

The fireball 610 can be virtually launched with initial state variables to indicate an initial location, a speed and direction vector, as well as a size (i.e., radius). The initial state 610a indicates the initial location. The second state 610b indicates the fireball 610 has moved in a direction toward the first mobile device 602. While the different states 610a-f are shown in discrete intervals in FIG. 6, the rate of data transfer over the inbound and outbound communication paths 410, 411, as well as other processing capabilities, may allow for a more continuous transition from state to state. The object interaction engine module 162 can be configured to determine when the fireball 610 interacts with the context 300. For example, the object interaction engine module 162 can indicate that the fireball 610 is interacting with the structural features in the map (e.g., walls, doors, windows). The results of the interaction can change the state of the fireball 610 such as reducing the size of the fireball 610 based on weighting information associated with the context features. For example, the fireball at a third state 610c interacts with a wall and thus is reduced in size as indicated in a fourth state 610d. The type and/or nature of a structural feature (e.g., context data 180, weighting information 182) can impact the results of the interaction calculations. Solid walls may reduce the size more significantly than windows or cubical dividers. For example, the state change from the fourth state 610d to a fifth state 610e can be small based on the weighting information and/or context information for the area. The fireball 610 can have a maximum range (e.g., a sixth state 610f) and an area of effect based on a target area. The interaction area 606 is determined based on the state of the fireball 610 as compared to the state of the first mobile device 602. State variables associated with the location of an AV object and a mobile device can be compared. In an example, the first mobile device 602 is in the path of the fireball 610 and thus is virtually hit. The second mobile device 604 moves to a new a new position and is not hit (e.g., does not interact with) the fireball 610.

In an example, the state of a mobile device can include application parameters, that will impact in interaction calculations. Continuing the fantasy fireball example of FIG. 6, the first mobile device 602 can include state variables to indicate the mobile device is shielded, or otherwise protected, from an interaction with the fireball 610. Other state variables based on the specific AV object application can be used. In an example, the fireball 610 can have a Lock-On target aspect which will attempt to target a specific user and/or mobile device. The context or weighting information can be used to determine if a mobile device is behind adequate cover (i.e., a thick wall which will block the fireball 610).

Figure 7:
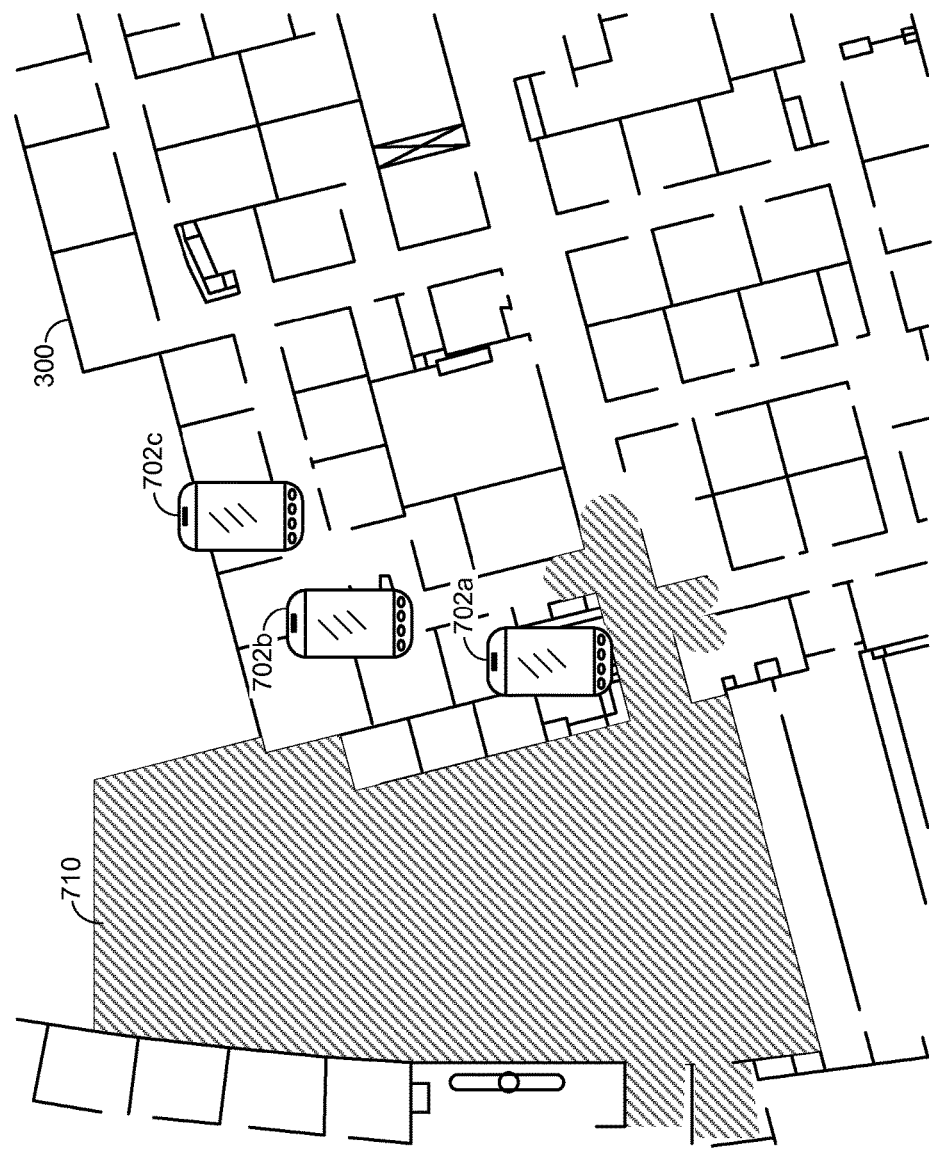
FIG. 7 is a top view of an exemplary expanding threat AV object.

Referring to FIG. 7, a top view of a context with an exemplary expanding threat is shown. The view includes a context 300, mobile devices 702a-c, and an expanding threat AV object 710. In an example, the expanding threat 710 can represent flooding or a swarm of insects which expands from a seed location through the context 300. The rate and direction of the expansion can be constrained by the structural elements in the context 300. The context data 180 and/or weighting information 182 can be used to constrain the spread of the threat. The object library 192 and associated items 176 may include:

Flood object=water.gif, physics=propagate through corridors and walls, volume reduces with distance For example, a flood game application may require the users (e.g., the mobile devices 702a-c) to avoid contact with the expanding threat 710. In an embodiment, the physics engine module 254 executing on the mobile device 702a can determine a current state of the expanding threat 710 and provide the threat state information to the AV server 110. The AV server can distribute the threat state information to additional mobile devices (e.g., the mobile devices 702b, 702c). In an embodiment, the AV server 110 can be configured to determine the state of the expanding threat 710 and distribute the state information to the mobile devices 702a-c.

Figure 8:
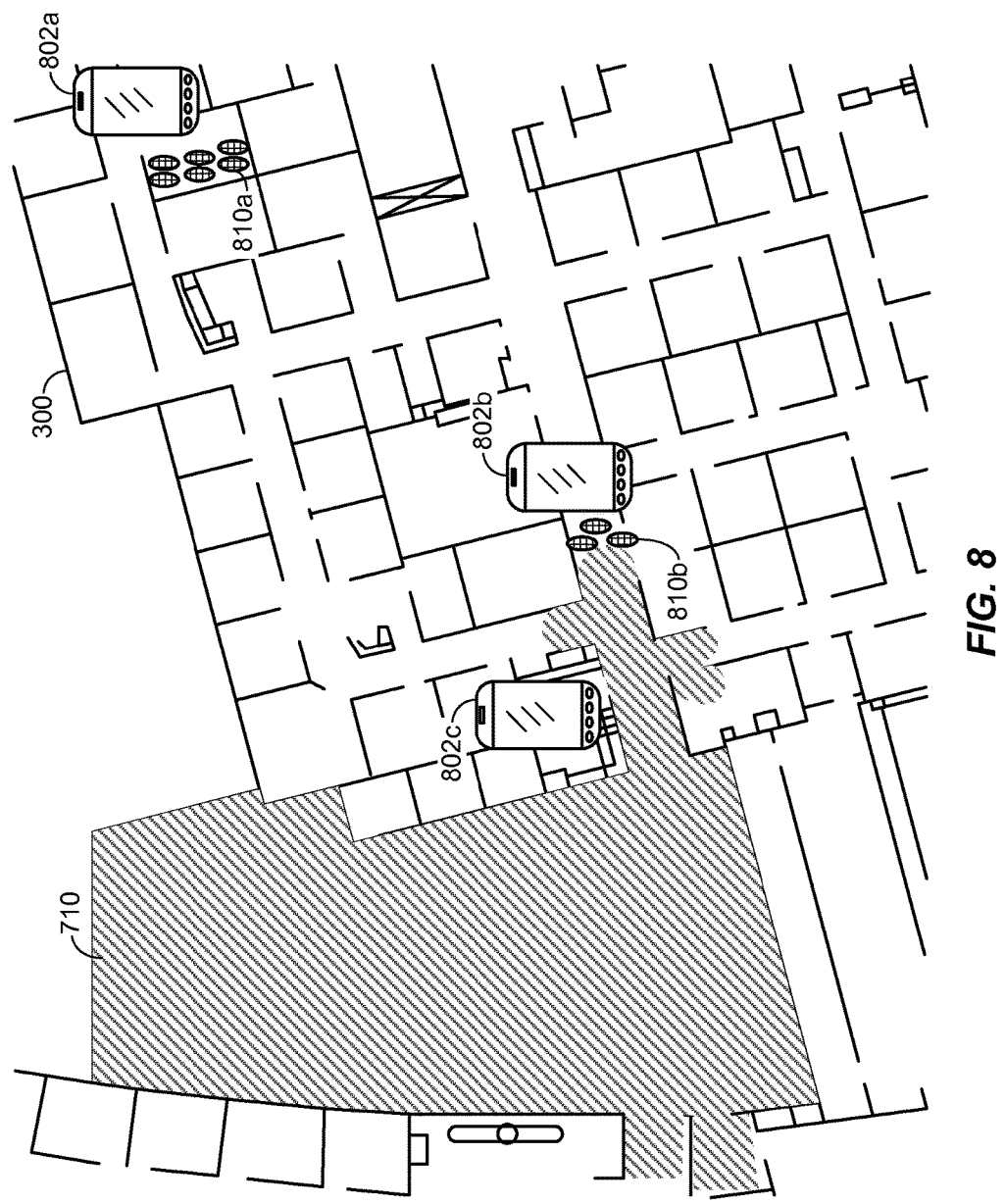
FIG. 8 is a top view of a context with an exemplary expanding threat and virtual tools AV objects.

Referring to FIG. 8, with further reference to FIG. 7, a top view of a context with an exemplary expanding threat and virtual tools AV objects is shown. The view includes a context 300, an expanding threat 710, a first mobile device 802a, a second mobile device 802b, a third mobile device 802c, a first set of virtual sandbags 810a, and a second set of virtual sandbags 810b. In an example, the expanding threat 710 is virtual flood AV object which is constrained by the context 300. A user may interact with virtual tools to help further constrain the flooding. For example, the virtual tools can represent virtual sandbags such as the first set virtual sandbags 810a and the second set of virtual sandbags 810b. In a training application, a user may be required to virtually pick up a virtual sandbag in a first location and then transport it to a second location. Such a virtual object can include a geofence around the object to determine when a mobile device is within a required proximity of the virtual object. The size (e.g., strictness, tolerance) of the geofence can depend on the positioning quality of a given venue. Referring to the example in FIG. 8, the first mobile device 802a is located near (i.e., within the geofence) the first set of virtual sandbags 810a. The object interaction engine module 162 can adjust the state of the mobile device to indicate that one or more virtual sandbags from the first set of virtual sandbags 810a has been virtually picked up. The second mobile device 802b is located in an area that is near, or in the path of, the expanding threat 710. The state of the second mobile device can be modified to indicate that one or more virtual sandbags have been virtually dropped. The second set of virtual sandbags 810b represent virtual tools which will interact with the virtual threat 710. In the flooding example, the second set of virtual sandbags block, or otherwise constrain, the path of the expanding threat 710. In a game application, an object can be for one team to constrain the expanding threat to the detriment of an opposing team (e.g., the third mobile device 802 is about to be trapped by the flood). The expanding flood and virtual sandbags are exemplary only, and not limitation, as other AV objects can be used to represent virtual threats and virtual tools (e.g., a swarm of insects/bug spray, roving aliens/laser pistols, virtual tiger/cage door levers).

Figure 9:
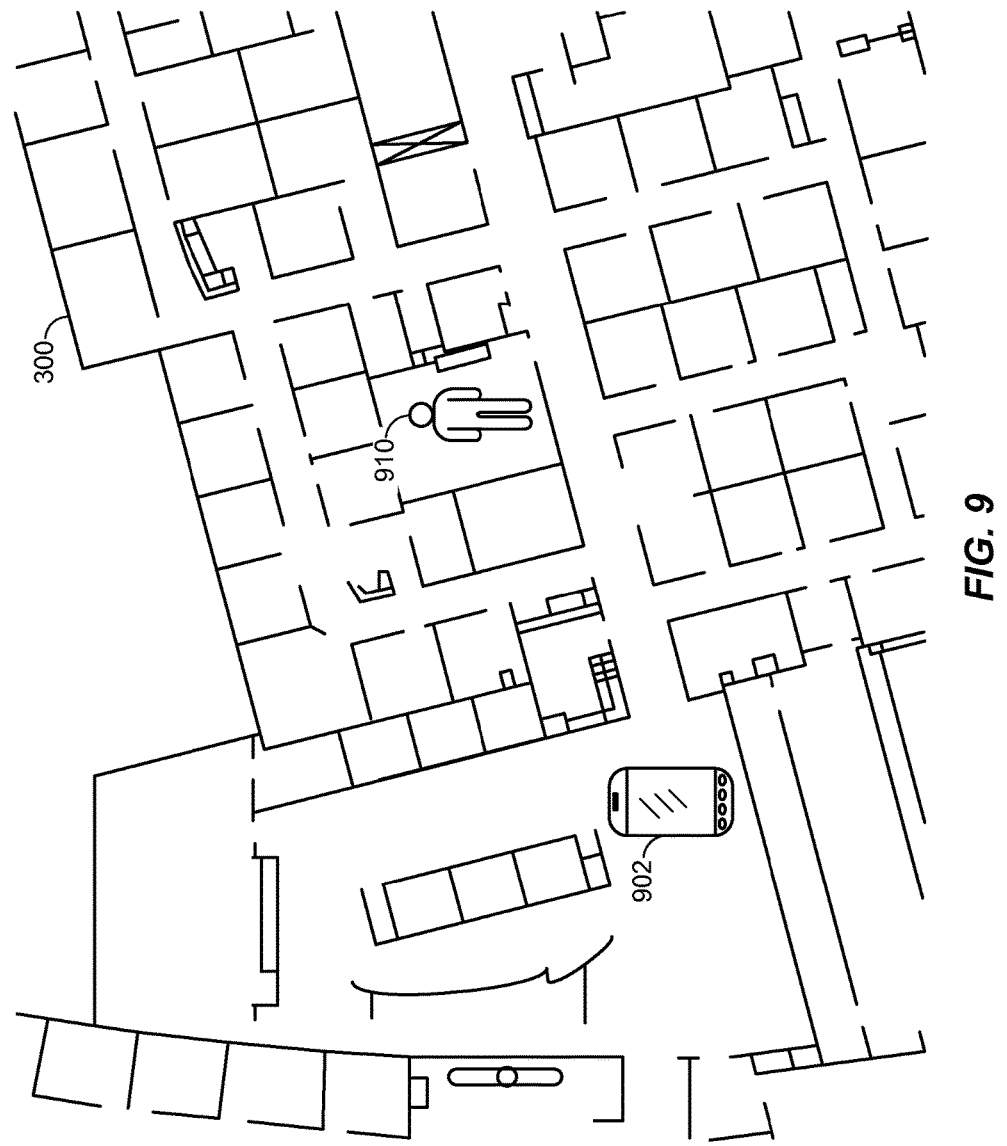
FIG. 9 is a top view of a context with an exemplary virtual trainer AV object.

Referring to FIG. 9, a top view of a context with an exemplary virtual trainer AV object is shown. The view includes a context 300, a mobile device 902 and a virtual trainer 910. The virtual objects are not limited to projectiles and expanding threats as previously described. Other virtual objects can be developed to interact with the user based on location and context. For example, a virtual trainer 910 can be configured to ambush (e.g., interact) with a user at a particular location with little or no warning (i.e., in an effort to keep the user's senses sharp). The ambush may lead to a first mini-game on the mobile device 902 followed by a chase through the context 300. The results of the interaction event, and/or a subsequent second mini-game, may change the state of the mobile device 902 and/or the virtual trainer 910. The virtual trainer 910 may hide in another location waiting to be found (e.g., hide and seek). Other virtual beings can be utilized.

Figure 10:
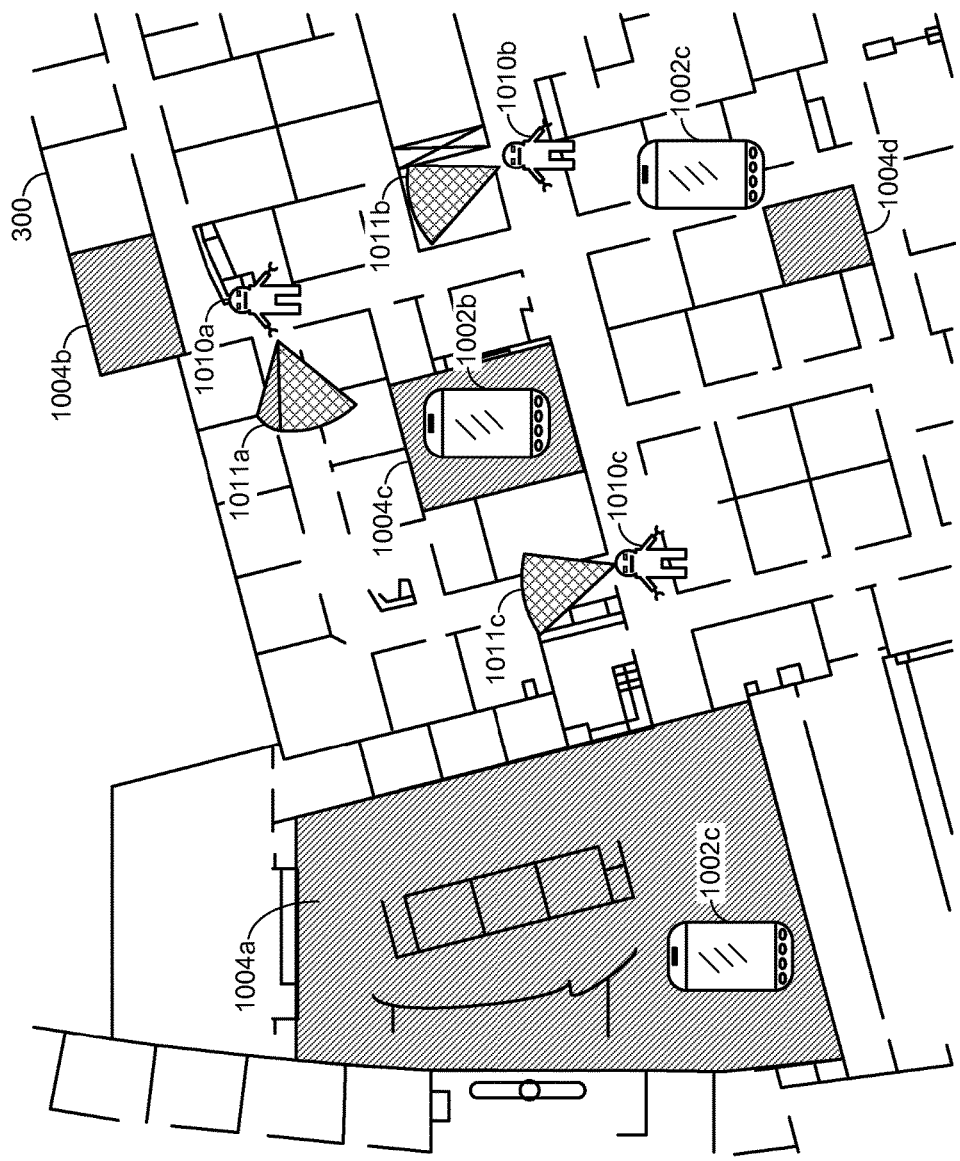
FIG. 10 is a top view of a context with multiple control areas and exemplary roving threat AV objects

Referring to FIG. 10, a top view of a context with multiple control areas and exemplary roving threat AV objects is shown. The view includes a context 300, a first mobile device 1002a, a second mobile device 1002b, a third mobile device 1002c, a first control area 1004a, a second control area 1004b, a third control area 1004c, a fourth control area 1004d, a first roving threat 1010a, a second roving threat 1010b and a third roving threat 1010c. Each roving threat 1010a-c includes a line-of-sight (LOS) indicator 1011a-c respectively. The number, nature, and locations of the control areas and the roving threats are exemplary only and not a limitation. The number of mobile devices is exemplary as a game application can be a single player or multiplayer configuration. In operation, the object library 192 can include virtual objects which define control areas within a context. The control areas can correspond to rooms, or be bounded by other structural features as determined by the context data 180 and/or the weighting information 182. In an example, a context can be converted into a virtual starship such that each of the control areas represents an iconic control station. The first control area1 1004a can represent a bridge, the second control area 1004b can represent a weapons station, the third control area 1004c can represent an engineering area, and a fourth control area 1004d can represent a store room. The object interaction engine module 162 can be configured to compute an interaction result based on the location of a mobile device in relation to the control areas. For example, the first mobile device 1002a is within the first control area 1004a and the resulting interaction result may be to initiate a bridge related mini-game (e.g., a first mini-game). The second mobile device 1002b is located within the third control area 1004c and the resulting interaction result may be to initiate an engineering related mini-game (e.g., a second mini-game). Other interaction results may be used and the corresponding states of the mobile devices and the control areas may be updated.

In an embodiment, the corridors between the control areas 1004a-d can include one or more roving threats 1010a-b. Continuing the science fiction theme, the roving threats can represent virtual robot aliens that move about the context 300. The movement of the roving threats 1010a-c is constrained by the context data 180 and/or the weighting information 182. Each of the roving threats 1010a-c may include a LOS indicator 1011a-c (i.e., a line of sight variable) to indicate a general direction of interest for the roving threat. In operation, the object interaction engine module 162 can be configured to compute an interaction result based on the location of the roving threat, as well as the current LOS indicator. The interaction result may be to initiate a roving threat related mini-game on the mobile device. In a game application, the states of the mobile devices, control areas, and the roving threats can be used to create a scoring mechanism. For example, the game may create a mission for the users to complete, and then subsequently create emergencies for the users to react to. The users may have to move about the context from control area to control area to complete the mission. Virtual tools may also be included in the game application. These rules and objectives are exemplary only as other game applications can be created to utilize context specific control areas and roving threats.

Figure 11:
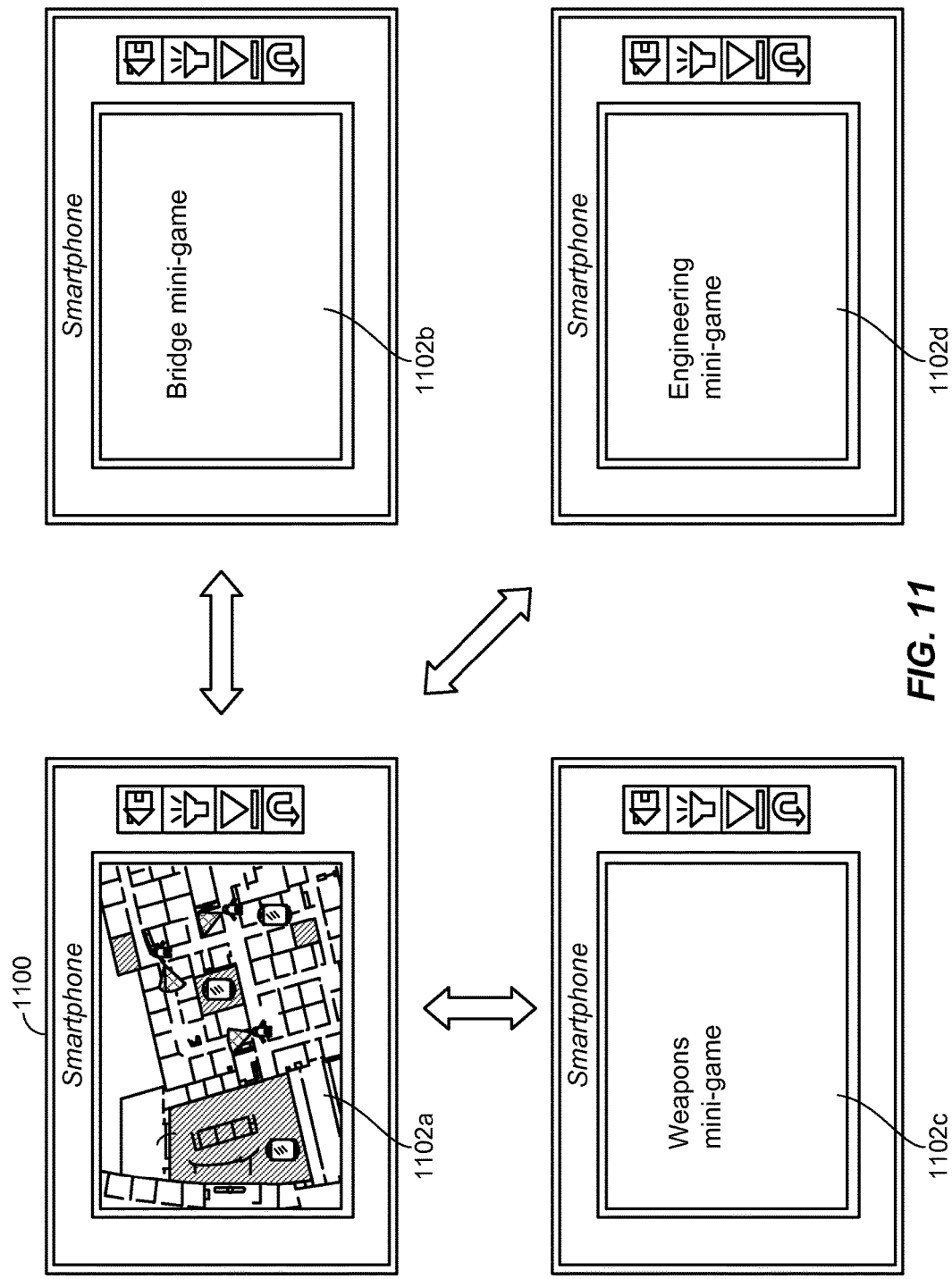
FIG. 11 is a top view of a mobile device executing one or more mini-games.

Referring to FIG. 11, with further reference to FIG. 10, a top view of a mobile device executing one or more mini-games is shown. The view includes a mobile device 1100 configured to execute and display a map application 1102a, a bridge mini-game application 1102b, a weapons mini-game application 1102c, and an engineering mini-game application 1102d. The map applications 1102a-d are exemplary only in view of the science fiction theme described with regards to FIG. 10. In operation, AV server 110 can store the map applications 1102a-b in the database 114 and provide the map applications 1102a-d to the mobile device 1100. The map applications 1102a-d can be initiated based on results computed by the object interaction engine module 162. For example, an application can be initiated when the mobile device 1100 enters a corresponding control area. The mini-game applications can be themed to the respective control area. The bridge mini-game may require the user to complete a flight simulator, the weapons mini-game may require the user to complete a target shooting game, and the engineering game may be a technical trivia game. A mini-game may include interacting with an AV object in an augmented reality application. For example, a user may use the camera view of the mobile device 1002c to obtain a view of the corridor leading to the roving threat 1010a. The display of the mobile device 1002c may concurrently show a live image of the corridor with an alien robot travelling down the corridor wherein the location of the alien robot is based on the state variables. The object of such a mini-game may be to virtually power-down the alien robot (e.g., via a tap on the robot image on the mobile device screen). Other mini-games may be used. The user's performance on a particular mini-game may change the state of the mobile device, the control area, or other game application related state model (e.g., location of the starship, damage conditions, threat level). The results of the mini-games may also be used to temporarily modify the context data based on the theme (e.g., close a door, open an air lock, activate a transporter).

Figure 12:
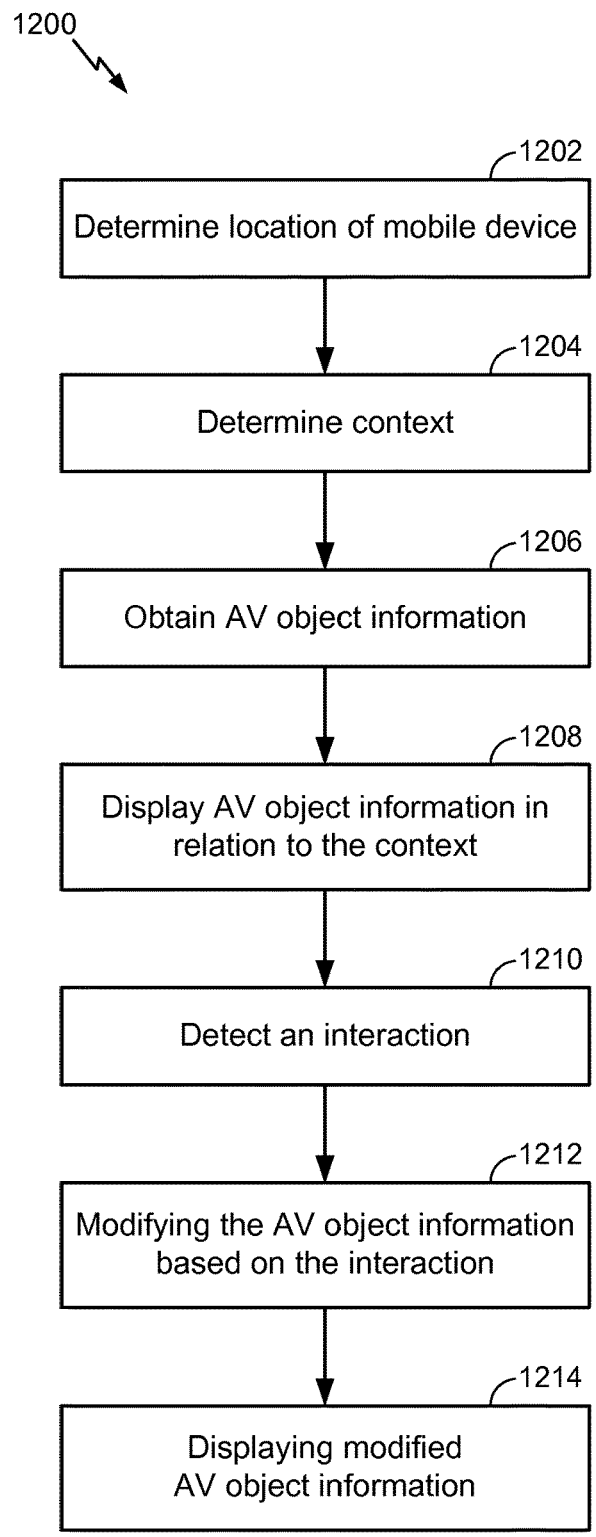
FIG. 12 is a block flow diagram of a process for displaying an AV object.

Referring to FIG. 12, with further reference to FIGS. 1-11, a process 1200 for displaying an AV object includes the stages shown. The process 1200 is, however, an example only and not limiting. The process 1200 can be altered, e.g., by having stages added, removed, rearranged, combined, performed concurrently, and/or having single stages split into multiple stages. For example, stage 1206 described below of receiving AV object information can be performed before stages 1202 and 1204. Still other alterations to the process 1200 as shown and described are possible.

At stage 1202, the mobile device 200, or the AV server 110, determines the location of the mobile device 200. The mobile device 200 may obtain wireless positioning signals from satellite and/or terrestrial based positioning systems. A trilateration based approach may be utilized by the mobile device 200 to determine the location of the mobile device. The device state module 256 can be updated with the location information and a collection of mobile device state variables can be provided to the AV server 110, or stored locally on the mobile device 200. In an embodiment, additional actions may be performed at the beginning of the process 1200. For example, a user can initiate a game, set a difficultly level, exchange game parameters, perform user authentication, or determine billing information. Other applications or operational steps may also be performed.

At stage 1204, the mobile device 200 or the AV server 110 determines a context. The context can be a floor map with structural features (including interaction values) stored as context data 180 in the database 114. The context can include weighting information 182 such as a RSSI/RTT heatmap. Additional media content items 178 can be included in the context. The context can be provided to the mobile device 200 based on the location determined at stage 1202, or can be previously stored on the mobile device 200 and accessed based on the location of the mobile device 200.

At stage 1206, the mobile device 200 can obtain AV object information from the AV server or from local memory. The AV object information can be stored in the object library 192 and can include one or more associated items 176 such as a media content item, an object physic engine, and metadata 186. The AV object information can also include a set of state variables which represent the current state of the AV object. The state variables can represent the location, size, movement speed and direction, interaction variables, and other information to model the actions of the AV object. The AV object information can be provided to the mobile device 200 based on the location determined at stage 1202. For example, the AV object information can be transmitted from the AV server 110 to the mobile device over the outbound communication path 410. The AV object can be previously stored on the mobile device 200 and persist in the storage media 210 (i.e., before the location is determined at stage 1202).

At stage 1208, the mobile device 200 is configured to display the AV object information in relation to the context. The mobile device 200 includes a graphical display 222 and an AV view 234 configured to display the context (e.g., a floor map, camera view) with an AV object as well as icons representing other mobile devices located in the context. For example, referring to FIG. 5, the context 300 is displayed with the virtual ball 510 and the mobile devices 502. The location of the AV object can be included as a state variable. The AV object state variables can be updated based on the execution of algorithms within the physics engine module 254 and or the object interaction engine module 162. The graphical display 222 can be configured to display the AV object based at least in part on the values of the state variables.

At stage 1210, the mobile device 200, or the AV server 110, are configured to detect an interaction. In an example, the object interaction engine module 162 can process the AV object information, the context information (e.g., context data 180 and/or weighting information 182), and the device state module 256 to detect an interaction. An interaction may occur, for example, when the AV object information indicates the AV object is near a structural element in the context (e.g., when a virtual ball bounces off the wall as depicted in FIG. 5). An interaction may be detected with the AV object information indicates the AV object is near a mobile device. An interaction may be detected based on gestures, or other device state information, input into the mobile device 200.

At stage 1212, the mobile device 200, or the AV server 110, are configured to modify the AV object information based on the interaction. The object interaction engine module 162 and/or physics engine module 254 are configured to compute an interaction result based on the detected interaction. The interaction result may indicate the speed and direction the AV object moves after the interaction. For example, a modification may be to reduce the value of AV object's speed state variable (i.e., decrease the virtual speed) based on the interaction results. The interaction result may indicate the size of the AV object is decreased after the interaction (i.e., modify the size state variable). Other state variables associated with AV object can be modified based on the interaction result. In the expanding threat example of FIG. 7, the interaction result may constrain the expansion of the AV object. The interaction result can be based on an interaction with the context 300, the mobile device 802c, a virtual tool (e.g., virtual sandbags 810b), or on combinations therein. The modified AV object information can be distributed to other mobile devices via the network 140.

At stage 1214, the mobile device 200 is configured to display the modified AV object information. The modified AV object information can include changes based on the modified state variables (e.g., changes in speed, direction, size), as well as changes in media content items 178 (e.g., graphic files, LOS indicators 1011). The changes in the media content items 178 can correspond to changes in the state variables (i.e., a state variable can be a pointer to a media content item). Displaying the modified AV object information can occur on a single mobile device, or on multiple mobile devices on the network 140.

Figure 13A:
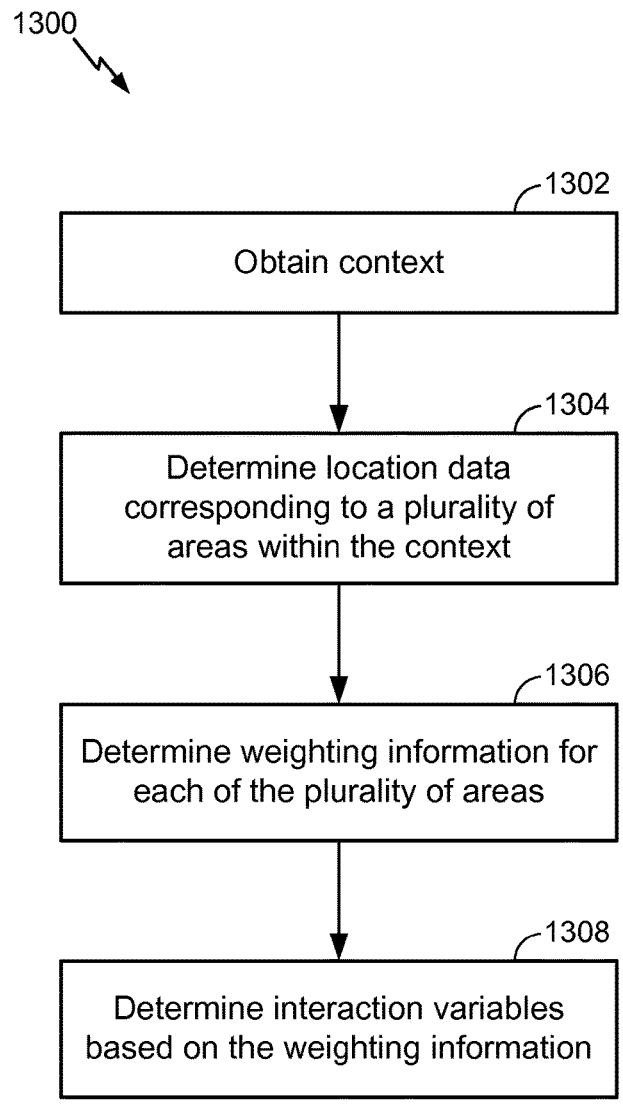
FIG. 13A is a block flow diagram of a process for determining interaction variables for areas within a context.

Referring to FIG. 13A, with further reference to FIGS. 1-4, a process 1300 for determining interaction variables includes the stages shown. The process 1300 is, however, an example only and not limiting. The process 1300 can be altered, e.g., by having stages added, removed, rearranged, combined, performed concurrently, and/or having single stages split into multiple stages.

At stage 1302, the AV server 110 can obtain context data 180. A developer can utilize a mobile device 420 to access the database 114 and store the context 300. The context can include, for example, a layout of a building having several areas. The context 300 can be a data file (e.g., .dwg, BIMXML) stored on the AV server 110 or a mobile device. The areas can be physically separated areas such as rooms, courtyards, hallways, and the like, or areas separated by non-physical boundaries, such as areas on a grid imposed on a map.

At stage 1304, the AV server 110 can be configured to determine location data corresponding to one or more areas within the context. The instructions 116 can include computer-readable instructions to cause the processor 118 to segment the context into areas. The segmentation can be based on structural features (e.g., walls, doors, windows) as well as an analysis of open space to determine the location of rooms, courtyards, hallways, and the like.

At stage 1306, the AV server 110 can be configured to determine weighting information for each of the areas. In an example, the weighting information can be included in an architectural file as a property and/or attribute of a specific architectural feature (e.g, material, size, radius, thickness, etc. . . . ). The weighting information may be based on the number of architectural features (e.g. walls, composition of walls, distance) and other factors that can impact RSSI and RTT signal information. The weighting information can be determined based on results provided from one or more mobile devices in the context. Referring to FIG. 3, for example, the access point 302 can capture RSSI and RTT signal information for the areas occupied by each of the mobile devices 304a, 304b, 304c. Weighting information corresponding to each of the areas can be stored in the database 114. In an example, the RSSI and/or RTT information may be correlated to an architectural feature property such a wall material. That is, an area within a context with low signal (i.e., high loss) may be correlated to a 'concrete' material, an area with a medium signal (i.e., medium loss) may be correlated to a 'drywall' material, and an area with a high signal (e.g., low loss) may be correlated to an open space. The weighting information for the context can be updated and refined over time as more mobile devices enter the context (e.g., crowdsourcing). The weighting information can be a heatmap which can overlay the physical layout of the context.

At stage 1308, the AV server 110 can be configured to determine interaction variables based on the weighting information. The interaction variables can be state variables and/or functions that are associated with the weighting information. The interaction variables may be based the composition of a structural feature (e.g., a hard wall, a door, an open corridor), or the signal strength based on RSSI and/or RTT data. The interaction variables can be used to the model the interaction between an AV object and an architectural feature within the context. For example, a virtual ball 510 may bounce off of a wall with a 'brick' material property, and break through a wall with a 'glass' material property. The interaction variables can be functions to determine, for example, the speed and direction of the virtual ball 510 as a result of the bounce or the break.

At In an embodiment, the composition and placement of walls can include a virtual component and the interaction variables may be based on the virtual component. For example, the weighting information for certain walls may indicate brick or concrete. This actual weighting information may be virtually designated to be 'stone' in a fantasy setting, or 'permacrete' in a science fiction setting. The interaction variables for the virtual designations may be used in the application. Other architectural or environmental features may be designated such virtual bookcases, tapestries, blast doors, or other virtual structures. The virtual characteristics may be based on the properties of the real feature. For example, the thickness and corresponding durability of a virtual stone wall may be relative to the characteristics (i.e., material, size, location, configuration) of real walls in the context. In operation, the object interaction engine module 162 can utilize the interaction variables or functions, as well as the feature properties, to determine an interaction result with an AV object. For example, referring to FIG. 6, a high value for an interaction variable may cause the state of the fireball 610 to reduce in size by a large amount, while a low value for an interaction variable may cause the state of the fireball 610 to reduce is size by a small amount. The impact of the interaction variables or functions may be different for different AV objects.

Figure 13B:
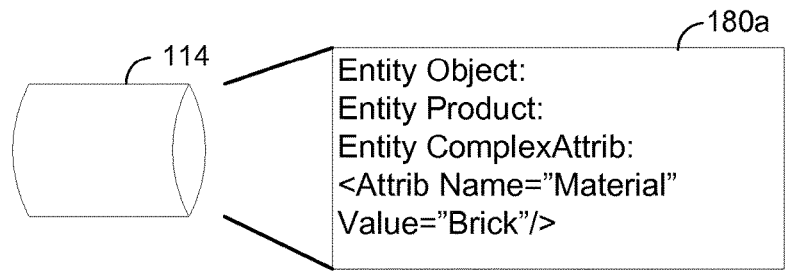
FIG. 13B is an exemplary data structure for weighting information and interaction variables.

Referring to FIG. 13B, an exemplary data structure for weighting information and interaction variables is shown. The database 114 can include a collection of context data 180 and weighting information 182. In an example, the context data 180 can be electronic representations of the context 300. Examples of the electronic representations may include, but are not limited to, Computer Automated Design (CAD) files, BIM files (e.g., BIMXML), and other proprietary files. The example context data record 180*a* of FIG. 13B utilizes a BIMXML format including an attribute tag (i.e., 'Attrib Value' tag). The tag is exemplary only and not a limitation. The attribute tag may be used to reference weighting information 180. For example, the context data record 180*a* indicates that the material of the context feature is 'brick.' The weighting information 182 may a collection records in a database, or other file structure, to correlate feature properties (e.g., attribute tags) with interaction variables or functions. As an example, a weighing information data table 182*a* can include a list of AV Objects 1320 and a collection of interaction variables or functions 1322. The weighting information data table 182*a* can be indexed by the architectural features (e.g., attribute tags) to be used, such as the material value example in FIG. 13B. For a given attribute tag (e.g., Null, Brick, Glass, Drywall, Concrete, etc. . . . ), and an AV Object (e.g., Ball, Water, Fire Ball, Robot), an interaction variable 1322 can be determined. For example, a Ball will interact with a Brick by utilizing the interaction function B(v,d). The function B(v,d) can be a call to a function within the object interaction engine module 162. The function call may include parameters such the velocity (v) and direction (d) vector of the example. Other parameters and other functions may be used for the various AV Object and weighting information values.

In an embodiment, the weighting information data table 182 may be indexed by signal parameters provided by the mobile device. For example, the attribute tags (e.g., Null, Brick, Glass, Drywall, Concrete) may be replaced with signal strength values, or other information based on the RSSI and/or RTT data. In this example, the selection of an interaction variable 1322 is based on AV Object and the signal parameters. In an embodiment, the attribute tags in the weighting information 182*a* can be augmented by the signal parameters such that the selection of the interaction variable is based on the AV Object and a combination of the attribute tag and the signal parameters.

Figure 14A:
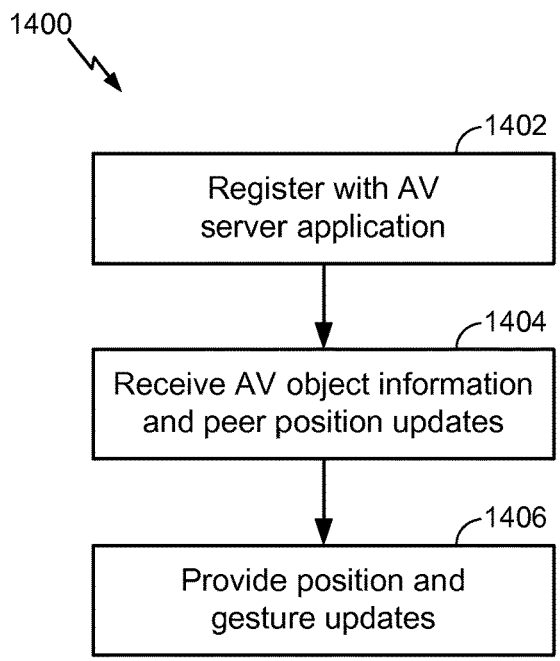
FIG. 14A is block flow diagram of a process for providing position and gesture updates to an AV server.

Referring to FIG. 14A, with further reference to FIG. 4, a process 1400 for providing position and gesture updates to an AV server includes the stages shown. The process 1400 is, however, an example only and not limiting. The process 1400 can be altered, e.g., by having stages added, removed, rearranged, combined, performed concurrently, and/or having single stages split into multiple stages. For example, stage 1406 described below of receiving AV object information and peer position updates can be performed before stage 1406. Still other alterations to the process 1400 as shown and described are possible.

At stage 1402, a mobile device 402*a* registers with the AV server 110 over the inbound communication path 411*a*. The registration process can be used to indicate that the mobile device 402*a* is ready to receive AV object information. The registration process may include security procedure (e.g., passwords), and may automatically occur when the mobile device 402 joins the network 140 or enters a context 300.

At stage 1404, the mobile device 402 receives AV object information and peer position updates from the AV server 110 via the outbound communication path 410*a*. The AV object information can persist in the database 114 and can be provided to the mobile device 402*a* after the registration in stage 1402. The AV object information can be previously stored in the database 212 on the mobile device 402*a*. The AV server 110 can be configured to receive peer position updates from other mobile devices (e.g., the mobile devices 402*b*, 402*c*) via the inbound communication paths 411*b*, 411*c* and provide the peer position updates to them the mobile device 402*a* via the outbound communication path 410*a*. The AV object information and peer position updates can be one or more state variables associated with the AV object and the mobile devices 402*b*, 402*c* respectively.

At stage 1406, the mobile device 402*a* provides position and gesture updates to the AV server 110 via the inbound communication path 411*a*. The position and gesture updates can be one or more state variables in the device state module 256. The object interaction engine module 162 can utilize the position and gesture updates to determine interaction events and/or update the AV object information. The AV server 110 can distribute the AV object information and position updates to the other mobile devices 402*b*, 402*c* as described at stage 1404.

Figure 14B:
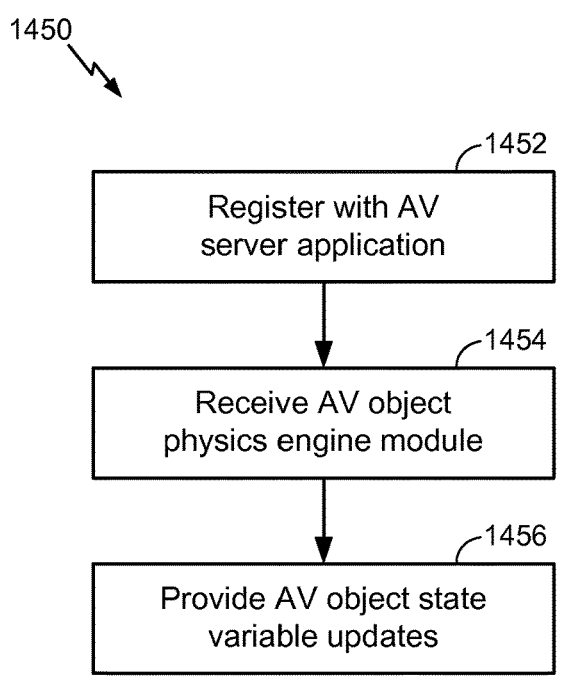
FIG. 14B is a block flow diagram of a process for providing AV object position updates to an AV server.

Referring to FIG. 14B, with further reference to FIG. 4, a process 1450 for providing AV object position updates to an AV server includes the stages shown. The process 1450 is, however, an example only and not limiting. The process 1450 can be altered, e.g., by having stages added, removed, rearranged, combined, performed concurrently, and/or having single stages split into multiple stages.

At stage 1452, a mobile device 402*a* registers with the AV server 110 over the inbound communication path 411*a*. The registration process can be used to indicate that the mobile device 402*a* is ready to receive AV object information. The registration process may include security procedure (e.g., passwords), and may automatically occur when the mobile device 402 joins the network 140 or enters a context 300.

At stage 1454, the mobile device 402*a* receives AV object information including an AV object physics engine module 174 from the AV server 110. The object physics engine module 174 executes locally (i.e., on the mobile device 402*a*) in the physics engine module 254. In operation, the physics engine module 254 simulates the motion of the AV object and updates the location or other AV object state variables. The rate of the updates can be based on specifications the processor 216 and the available bandwidth of the network 140. The physics engine module 254 and the object interaction engine module 162 may be used determine the results of interactions between an AV object and the context. For example, the context and corresponding weighting information can be stored on the mobile device and available for processing by the physic engine and object interaction engine modules.

At stage 1456, the mobile device 402*a* provides AV object state variable updates to the AV server via the inbound communication path 411*b*. The AV server can broadcast the updated AV object state variables to the other mobile devices 402*b*, 402*c*. The AV server 110 can be configured to selectively provide updates to the other mobile devices 402*b*, 402*c* based on their corresponding state variables (e.g., position, game specific conditions).

Figure 15:
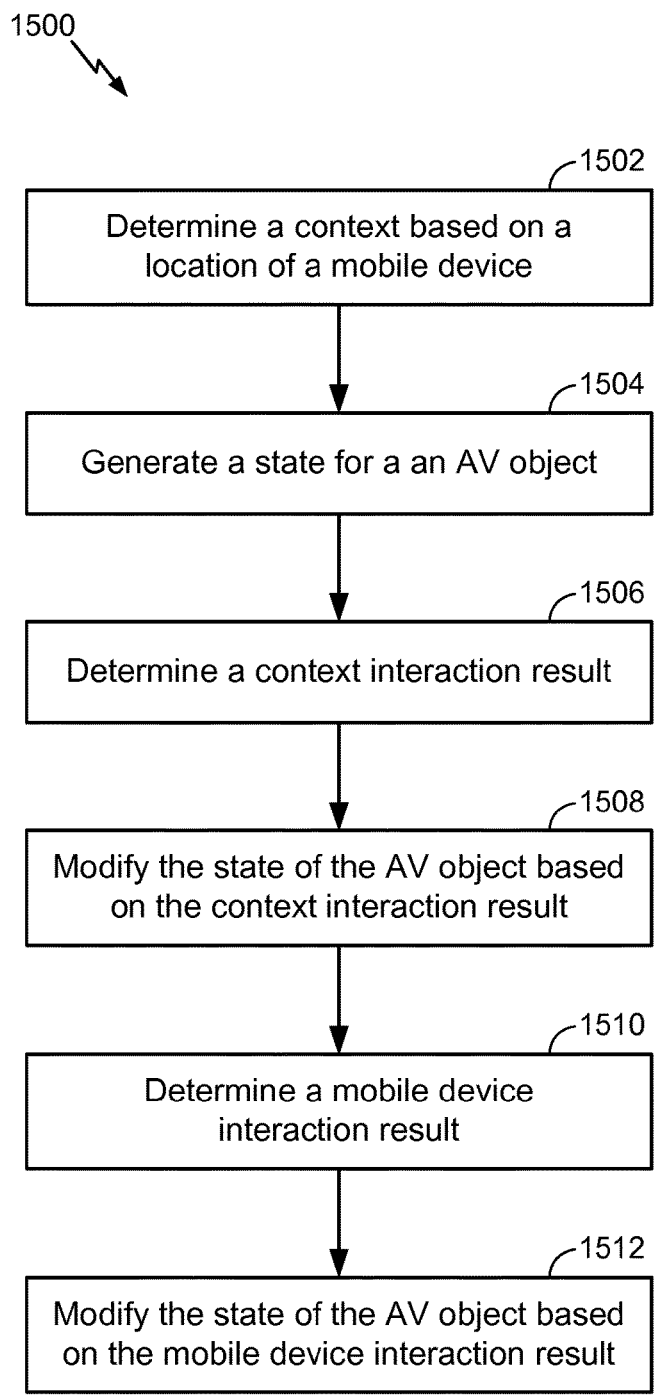
FIG. 15 is a block flow diagram of a process for modifying the state variables of an AV object.

Referring to FIG. 15, with further reference to FIG. 5, a process 1500 for modifying the state variables for an AV object includes the stages shown. The process 1500 is, however, an example only and not limiting. The process 1500 can be altered, e.g., by having stages added, removed, rearranged, combined, performed concurrently, and/or having single stages split into multiple stages. For example, stage 1510 described below for determining a mobile device interaction result can be performed before stages 1506 and 1508. Still other alterations to the process 1500 as shown and described are possible.

At stage 1502, a mobile device 502*c* or an AV server 110 can be configured to determine a context based on the location of the mobile device 502*c*. For example, the context 300 can be a floor diagram of an office building. The AV server 110 can provide the context 300 to the mobile device 502*c* over the network 140 when the mobile device enters a location within the context 300. The context 300 may be previously stored on the mobile device 502*c*.

At stage 1504, a mobile device 502*c* or an AV server 110 can be configured to generate an initial state for an AV object. For example, the initial state of the virtual ball 510 includes a position 'A' with initial direction and speed information. The initial state of the AV object can be generated by the mobile device.

At stage 1506, the object interaction engine module 162, executing on mobile device 502*c* or on the AV server 110, can be configured to process the state of an AV object with context data 180 and/or weighting information 182 (e.g., interaction variables). An output from the object interaction engine module 162 can be an interaction result. For example, with the virtual ball 510 is located at position 'C', the result is to modify (i.e., change the value of) the state variables associated with the direction and speed of the virtual ball 510 at stage 1508. Other interaction results are possible. For example, the context interaction result may reduce the size of the AV object (e.g., fireball 610), or constrain the AV object (e.g., expanding threat 710).

At stage 1510, the object interaction engine module 162, executing on mobile device 502*c* or on the AV server 110, can be configured to process the state of the AV object with mobile device state information. For example, when the virtual ball 510 reaches position 'E', the user of the mobile device 502*c* can enter a gesture, or other sensor input, to the mobile device 502*c* and modify the state of the mobile device 502*c*. The interaction result may modify the state of the AV object at stage 1512. The interaction result may also modify the state of the mobile device 502*c* and/or the state of the context 300. For example, if the virtual ball 510 is a boulder, the interaction result may be to temporarily remove a wall or other structure in the context 300. The modified AV object can be displayed on the mobile device 502*c*, as well as on the other mobile devices 502*a*, 502*b*.

Figure 16:
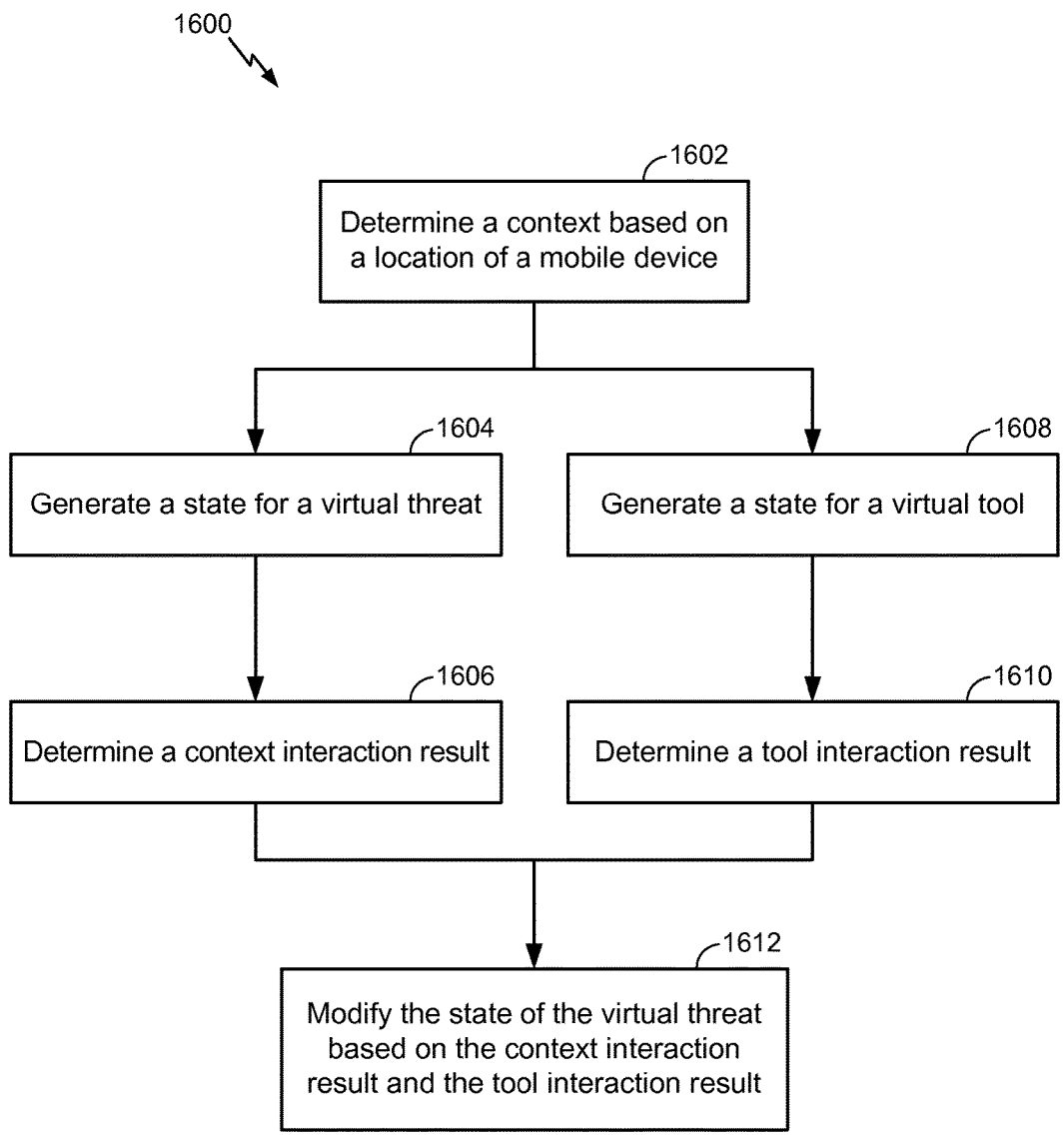
FIG. 16 is a block flow diagram of a process for modifying the state variables of an AV object based on context or tool interaction.

Referring to FIG. 16, with further reference to FIG. 8, a process 1600 for modifying the state variables of an AV object based on context or tool interaction includes the stages shown. The process 1600 is, however, an example only and not limiting. The process 1600 can be altered, e.g., by having stages added, removed, rearranged, combined, performed concurrently, and/or having single stages split into multiple stages.

At stage 1602, a mobile device 802*a* or an AV server 110 can be configured to determine a context based on the location of the mobile device 802*a*. For example, the context 300 can be a floor diagram of an office building. The context 300 can be provided to the mobile device 802*a* over the network 140 when the mobile device enters a location within the context 300. The context 300 can be previously stored on the mobile device 802*a*.

At stage 1604, a mobile device 802*a* or an AV server 110 can be configured to generate a state for a virtual threat. The initial state of the virtual threat may include an initial position and movement variables. For example, the expanding threat 710 can include a seed position and a flood rate variable to determine how fast the expanding threat 710 will flood an area. The initial state may also include variables to indicate the boundaries (e.g., a polygon) of the expanding threat 710.

At stage 1606, an object interaction engine module 162, executing on the mobile device 802*a* or on the AV server 110, can be configured to determine a context interaction result. For example, the context 300 includes wall which will constrain the expanding threat 710. The context interaction result can modify the boundary variables in the expanding threat 710 state information. Other context interaction results may also be determined.

At stage 1608, a mobile device 802*a* or an AV server 110 can be configured to generate a state for a virtual tool. The initial state of the virtual tool may include an initial position and an interaction variable. For example, the virtual sandbags 810*a* can be located in the context 300 in an area that is separate from the area occupied by the expanding threat. An object of a gaming application may be to require the users to relocate a virtual tool from a first location to a second location. A user may move a virtual tool into a position to cause an interaction with another AV object. The mobile device 802*b* has moved the virtual sandbags 810*b* to interact with the expanding threat 710.

At stage 1610, an object interaction engine module 162, executing on the mobile device 802*a* or on the AV server 110, can be configured to determine a tool interaction result. For example, the state of the virtual sandbags 810*b* and the state of the expanding threat 710 can be processed by the object interaction engine module 162 to determine the tool interaction result. The tool interaction result may modify the boundary state variables of the expanding threat 710.

At stage 1612, the state of the virtual threat can be modified based on the context interaction result and/or the tool interaction result. The sandbag virtual tool is exemplary only and not a limitation. Other virtual tools can be used. For example, continuing the flooding example, a virtual tool could be a virtual drain, or a virtual freeze ray, or a virtual sponge. The order of calculation for the context interaction result and the tool interaction result are exemplary only. The results be calculated serially or in parallel. In some applications, a synergy between a context area and a virtual tool can be used (e.g., the combined effect is greater than the individual effects added individually). An application can have multiple virtual tools each with different interaction results for a given virtual threat.

Figure 17:
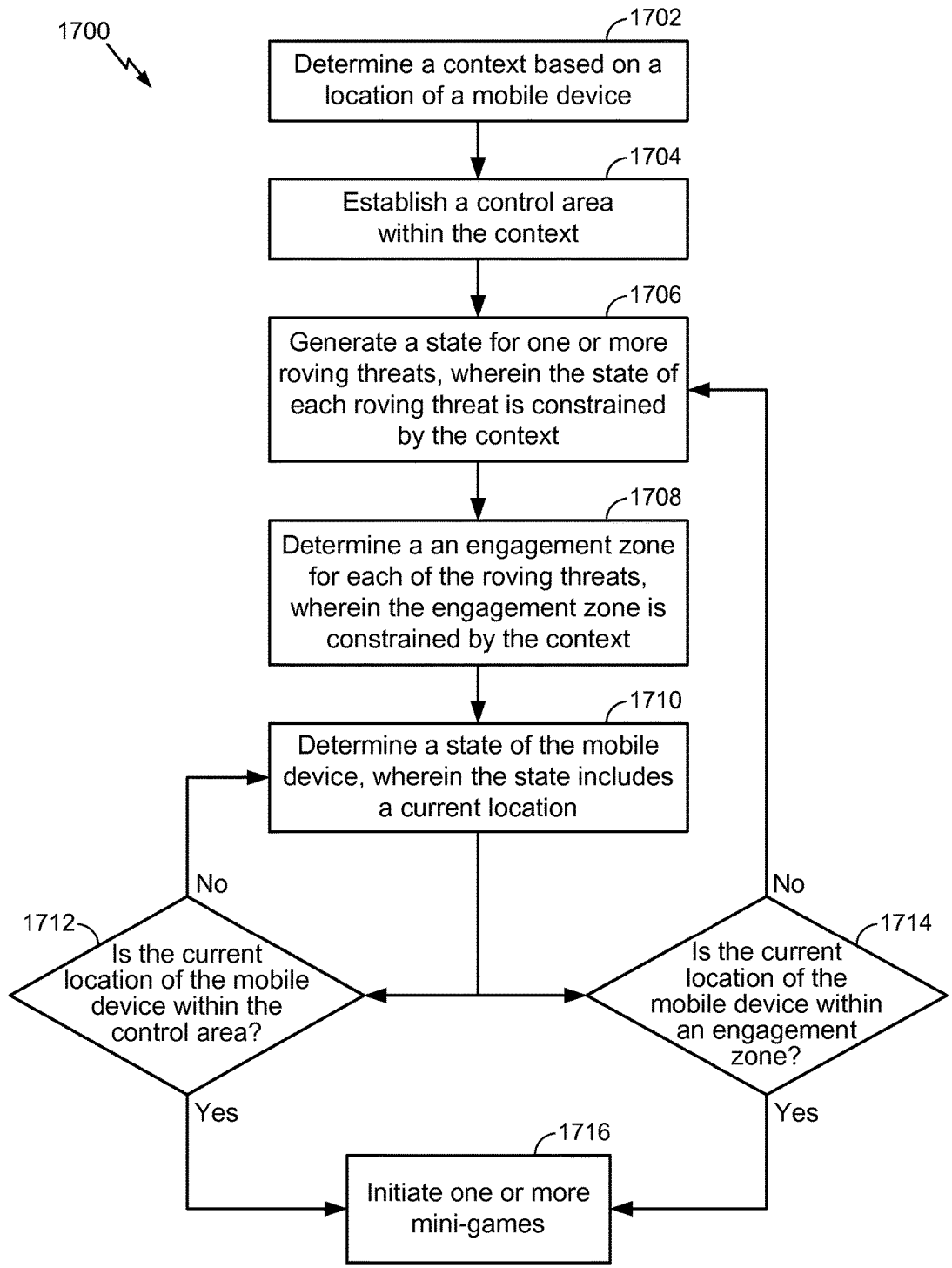
FIG. 17 is a block flow diagram of process for initiating a mini-game on a mobile device.

Referring to FIG. 17, with further reference to FIG. 10, a process 1700 for process for initiating a mini-game on a mobile device includes the stages shown. The process 1700 is, however, an example only and not limiting. The process 1700 can be altered, e.g., by having stages added, removed, rearranged, combined, performed concurrently, and/or having single stages split into multiple stages.

At stage 1702, a mobile device 1002*a* or an AV server 110 can be configured to determine a context based on the location of the mobile device 1002*a*. For example, the context 300 can be a floor diagram of an office building. The context 300 can be provided to the mobile device 1002*a* over the network 140 when the mobile device enters a location within the context 300. The context 300 can be previously stored on the mobile device 1002*a*.

At stage 1704, a mobile device 1002*a* or an AV server 110 can be configured to establish one or more control areas within the context. A control area can correspond to rooms, courtyards, hallways, and the like, or areas separated by non-physical boundaries, such as areas on a grid imposed on the context 300. A control area can be an AV object with corresponding state variables. The AV server 110 can broadcast the control area to other mobile devices (e.g., 1002*b*, 1002*c*).

At stage 1706, a mobile device 1002*a* or an AV server 110 can be configured to generate a state for one or more roving threats. As an example, and not a limitation, an initial state of the roving threat may include an initial position, movement and line of sight variables. The movement and line of sight for the roving threat can be constrained by the context. For example, referring to FIG. 10, the roving threat 1010*a* represents an alien robot configured to roam the corridors of the context 300. The roving threat 1010*a* can randomly change its LOS indicator 1011*a* in different directions. The state variables for the roving threat can be updated to indicate the direction of the LOS indicator 1011*a*.

At stage 1708, a mobile device 1002*a* or an AV server 110 can be configured to determine an engagement zone for each of the roving threats. For example, an engagement zone may be a defined area around a roving threat. The engagement zone may include LOS information, thus allowing a user to sneak-up behind the roving threat without being detected. The engagement zone can be constrained by the context 300. The roving threat LOS may be blocked by walls or other structural items as defined in the context data 180 and/or the weighting information 182. At stage 1710, the state of the mobile device 1002*a* can be determined. The object interaction engine module 162 can be configured to compare the location of the mobile device with the location of the engagement zones for one or more roving threats at stage 1714. If the comparison indicates that the mobile device is within the roving threat engagement zone, the mobile device can be configured to execute a mini-game application at stage 1716. For example, a user may have to complete a combat related mini-game to attempt to defeat, or flee from, a roving threat. The results of the mini-game can impact the state variables for the mobile device and the roving threat. For example, the roving threat may have a damage variable which can be reduced as a result of a mini-game.

At stage 1712, the object interaction engine module 162 can be configured to determine if the current location of a mobile device is within a control area. For example, referring to FIG. 10, the mobile device 1002*a* is within the control area 1004*a*. While the mobile device 1002*a* is within the control area 1004*a*, a mini-game may be presented to the user at stage 1716. The mini-game may correspond to the control area (e.g., the simulated bridge example described above), and the results of the mini-game may impact the state variables of the mobile device, the control area, or other application based data fields.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition. A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software (e.g., computer program product) executed by a processor, hardware, firmware, hardwiring, or combinations of any of these. Such software can be a computer program product residing on a processor-executable storage medium. Features implementing functions may also be physically located at various positions, including being distributed such that portions of functions are implemented at different physical locations.

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code. For example, the computer-readable media can be computer program product residing on a processor-executable storage medium, the a computer program product including processor-executable instructions configured to cause a processor to perform one or more features described herein.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method of using virtual tools in Augmented Virtuality (AV) applications, comprising:
    initiating an AV application at a mobile device, wherein the AV application generates one or more AV objects within a location-based context, the location-based context including location and configuration information associated with a plurality of physical objects in a region spanned by the location-based context;
    generating a display at the mobile device based on the initiation of the AV application, the display including a representation of at least a first AV object and at least a second AV object, wherein the first AV object is associated with a plurality of state variables including at least a seed location state variable, an expansion rate state variable, and an expansion direction state variable, and the second AV object is associated with a plurality of state variables including at least a tool location state variable, wherein the tool location state variable is modified based on one or more locations of the mobile device within the location-based context;
    determining a virtual interaction of the first AV object based at least in part on the tool location state variable of the second AV object, wherein the virtual interaction constrains the first AV object expansion direction state variable; and
    generating an updated display at the mobile device, the updated display including an updated representation of the first AV object based on the constrained expansion direction state variable.

2. The method of claim 1 wherein modifying the tool location state variable of the second AV object includes relocating the mobile device from a first location to a second location within the location-based context.

3. The method of claim 1, wherein the second AV object is associated with a geofence, the method further comprising:
    determining a location of the mobile device falls within the geofence associated with the second AV object; and
    permitting the AV application to interact with the second AV object responsive to the location of the mobile device falling within the geofence associated with the second AV object.

4. An apparatus for using virtual tools in Augmented Virtuality (AV) applications, comprising:
    a memory module;
    a processor coupled to the memory module and configured to:
        execute an AV application on a mobile device, wherein the AV application generates one or more AV objects within a location-based context, the location-based context including location and configuration information associated with a plurality of physical objects in a region spanned by the location-based context;
        generate a display at the mobile device based on the execution of the AV application, the display including a representation of at least a first AV object and at least a second AV object, wherein the first AV object is associated with a plurality of state variables including at least a seed location state variable, an expansion rate state variable, and an expansion direction state variable, and the second AV object is associated with a plurality of state variables including at least a tool location state variable, wherein the tool location state variable is modified based on one or more locations of the mobile device within the location-based context;

determine a virtual interaction of the first AV object based at least in part on the tool location state variable of the second AV object, wherein the virtual interaction constrains the first AV object expansion direction state variable; and generate an updated display at the mobile device, the updated display including an updated representation of the first AV object based on the constrained expansion direction state variable.

5. The apparatus of claim 4 wherein the processor is further configured to modify the tool location state variable of the second AV object based on relocating the mobile device from a first location to a second location within the location-based context.

6. An apparatus for using virtual tools in Augmented Virtuality (AV) applications, comprising:

means for initiating an AV application at a mobile device, wherein the AV application generates one or more AV objects within a location-based context, the location-based context including location and configuration information associated with a plurality of physical objects in a region spanned by the location-based context;

means for generating a display at the mobile device based on the initiation of the AV application, the display including a representation of at least a first AV object and at least a second AV object, wherein the first AV object is associated with a plurality of state variables including at least a seed location state variable, an expansion rate state variable, and an expansion direction state variable, and the second AV object is associated with a plurality of state variables including at least a tool location state variable, wherein the tool location state variable is modified based on one or more locations of the mobile device within the location-based context;

means for determining a virtual interaction of the first AV object based at least in part on the tool location state variable of the second AV object, wherein the virtual interaction constrains the first AV object expansion direction state variable; and means for generating an updated display at the mobile device, the updated display including an updated representation of the first AV object based on the constrained expansion direction state variable.

7. The apparatus of claim 6 comprising means for modifying the tool location state variable of the second AV object based on a first location of the mobile device within the location-based context and a second location of the mobile device within the location-based context.

8. A computer program product residing on a non-transitory processor-executable storage medium, the computer program product comprising processor-executable instructions configured to cause a processor to:

initiate an AV application on a mobile device, wherein the AV application generates one or more AV objects within a location-based context, the location-based context including location and configuration information associated with a plurality of physical objects in a region spanned by the location-based context;

generate a display at the mobile device based on the initiation of the AV application, the display including a representation of at least a first AV object and at least a second AV object, wherein the first AV object is associated with a plurality of state variables including at least a seed location state variable, an expansion rate state variable, and an expansion direction state variable, and the second AV object is associated with a plurality of state variables including at least a tool location state variable, wherein the tool location state variable is modified based on one or more locations of the mobile device within the location-based context;

determine a virtual interaction of the first AV object based at least in part on the tool location state variable of the second AV object, wherein the virtual interaction constrains the first AV object expansion direction state variable; and generate an updated display at the mobile device, the updated display including an updated representation of the first AV object based on the constrained expansion direction state variable.

9. The computer program product of claim 8 further comprising instructions configured to cause the processor to modify the tool location state variable of the second AV object based on relocating the mobile device from a first location to a second location within the location-based context.

* * * * *